United States Patent [19]

Murata et al.

[11] Patent Number: 4,496,714
[45] Date of Patent: Jan. 29, 1985

[54] POLYESTER, ADHESIVES COMPRISING THE SAME, AND LAMINATES AND LAMINATED HOLLOW VESSELS MADE THEREOF

[75] Inventors: Yoshifumi Murata; Keishiro Igi, both of Kurashiki; Hiroshi Narukawa, Sojya; Masao Uetsuki, Kurashiki; Satoshi Bando, Kurashiki; Shuji Kawai, Kurashiki; Kenji Shirano, Kurashiki, all of Japan

[73] Assignee: Kuraray Co., Ltd., Kurashiki, Japan

[21] Appl. No.: 561,838

[22] Filed: Dec. 15, 1983

[30] Foreign Application Priority Data

Dec. 21, 1982 [JP] Japan ................................ 57-225426
Jan. 26, 1983 [JP] Japan ................................ 58-11924

[51] Int. Cl.³ .............................................. C08G 63/02
[52] U.S. Cl. ................................... 528/272; 528/282; 528/302
[58] Field of Search ....................... 528/272, 282, 302

[56] References Cited

U.S. PATENT DOCUMENTS 2,720,506 10/1955 Caldwell et al. ..................... 528/282
3,533,973 10/1970 Stewart et al. ...................... 528/282

FOREIGN PATENT DOCUMENTS 943380 of 1956 Fed. Rep. of Germany .
1079323 of 1954 France .
1426192 of 1966 France .

Primary Examiner—Lucille M. Phynes
Attorney, Agent, or Firm—Barry Kramer

[57] ABSTRACT

An aluminum atom- and monocarboxylic acid residue-containing polyester is provided. Using the polyester as an adhesive or a base, laminates and laminated hollow vessels which comprise, as the constituent elements, the polyester and an ethylene-vinyl alcohol copolymer can be produced. The laminates and laminated hollow vessels are suitable for use as packaging materials or containers for food and drink.

9 Claims, 6 Drawing Figures

POLYESTER, ADHESIVES COMPRISING THE SAME, AND LAMINATES AND LAMINATED HOLLOW VESSELS MADE THEREOF

BACKGROUND OF THE INVENTION

1. Field of the Invention

This invention relates to a novel, aluminum atom- and monocarboxylic acid residue-containing polyester, adhesives comprising such polyester, and laminates and laminated hollow vessels comprising such polyester as a constituent element.

2. Description of the Prior Art

Polyesters, typically polyethylene terephthalate, are enjoying an increasing demand in the manufacture not only of fibers and of films but also of containers for food and drink and of food packaging films owing to their favorable mechanical properties, transparency, heat resistance, electrical characteristics, and the like. Since such polyester containers and films, to a certain extent, function as gas barriers, their use is favorable for the preservation of food and drink and the like. However, for certain kinds of food and drink which are to be packed therewith or contained therein, further improvement in gas barrier function is demanded.

Attempts heretofore have been made to provide laminated containers and films using a polyester and another resin superior thereto in gas barrier function (especially, an ethylene-vinyl alcohol copolymer). Thus, for instance, Japanese Kokai Tokkyo Koho No. 56-77,144 and Japanese Kakai Tokkyo Koho No. 57-128,516 disclose laminated hollow vessels made of a polyester and an ethylene-vinyl alcohol copolymer. These hollow vessels, however, show a marked tendency to interlayer separation because the adhesion between the polyester and the ethylene-vinyl alcohol copolymer is poor and no adhesive is used for uniting both the polymer layers with each other.

Japanese Kokai Tokkyo Koho No. 53-108,162 discloses a laminated hollow vessel comprising a polyester layer and an ethylene-vinyl alcohol copolymer layer adhered together with an adhesive blend of the materials of both the layers, namely the polyester and the ethylene-vinyl alcohol copolymer, and Japanese Kokai Tokkyo Koho No. 56-117,653 discloses a laminated hollow vessel made of a polyester and an ordinary ethylene-vinyl alcohol copolymer adhered together by means of a high ethylene content ethylene-vinyl alcohol copolymer. However, such adhesives are still insufficient to provide good interlayer adhesion and accordingly the hollow vessels produced by using them are not suited for practical use. In particular, the low adhesion strength between the adhesive layer and the polyester layer has been a problem.

Accordingly, development of an adhesive capable of firmly adhering a polyester layer to an ethylene-vinyl alcohol copolymer layer or of an improved polyester for use as a base capable of adhering to a carboxyl-containing polyolefin adhesive which is known to adhere well to an ethylene-vinyl alcohol copolymer has been strongly demanded so that laminated articles can be produced from a polyester and an ethylene-vinyl alcohol copolymer.

SUMMARY OF THE INVENTION

An object of the present invention is to provide a novel polyester superior in adhesion and an adhesive comprising such polyester. Another object of the present invention is to provide a laminate or laminated hollow vessel made of a polyester such as polyethylene terephthalate and an ethylene-vinyl alcohol copolymer adhered together by means of said adhesive. A further object of the present invention is to provide a laminate or laminated hollow vessel made of the above novel polyester, which serves as a base, and an ethylene-vinyl alcohol copolymer adhered together by means of a carboxyl-containing polyolefin adhesive.

The above objects are accomplished by providing a thermoplastic polyester comprising the constituent units represented by the following formulas (I), (II), (III) and (IV):

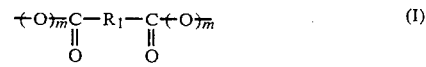

(I)

(II)

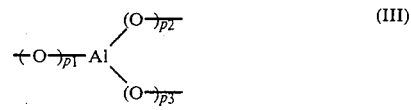

(III)

(IV)

wherein $R_1$, in its repeated occurrence in said polyester, represents one or more divalent groups each derived from a dicarboxylic acid selected from the group consisting of terephthalic acid, isophthalic acid, orthophthalic acid and a straight-chained aliphatic dicarboxylic acid containing 4 to 10 carbon atoms by removal of both carboxyl groups therefrom; $R_2$, in its repeated occurrence in said polyester, represents one or more monovalent groups each selected from the group consisting of an aliphatic or alicyclic monocarboxylic acid containing 6 to 30 carbon atoms and an aromatic monocarboxylic acid containing 7–20 carbon atoms by removal of the carboxyl group therefrom, D, in its repeated occurrence in said polyester, represents one or more divalent groups each derived from a diol selected from the group consisting of an aliphatic diol containing 2 to 10 carbon atoms and an alicyclic diol containing 6 to 8 carbon atoms by removal of both hydroxyl groups therefrom, and m, n, $p_1$, $p_2$, $p_3$ and q are each an integer of 0 or 1, said constituent units being bonded together in the combinations of (I)-(II), (I)-(III), (II)-(III), (II)-(IV), (III)-(III) and (III)-(IV) and via only one oxygen atom in each combination, the molar ratio (I):(II) being substantially 1:1, the molar ratio (I):(III) being in the range of 1,000:1 to 100:5 and the molar ratio (III):(IV) being in the range of 4:1 to 1:10, said polyester having an intrinsic viscosity of not less than 0.5 dl/g.

BRIEF DESCRIPTION OF THE DRAWINGS

In the accompanying drawings.

DETAILED DESCRIPTION OF THE INVENTION

Figure 1:
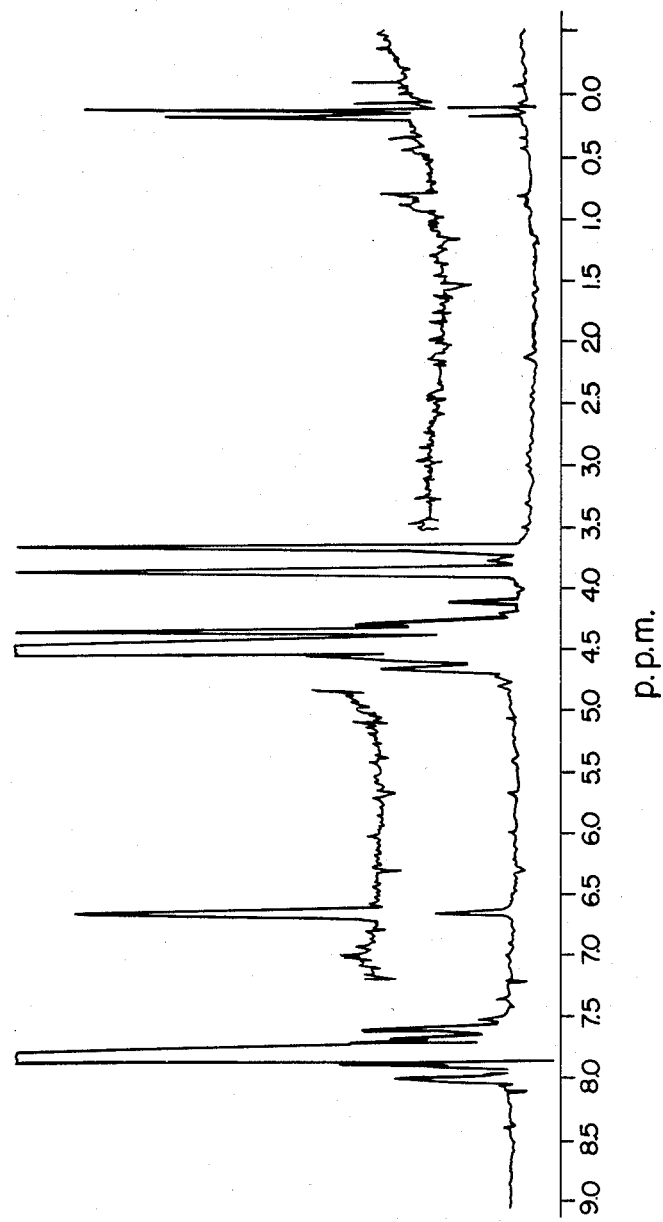
FIG. 1 shows the nuclear magnetic resonance spectrum of the polyester obtained in Example 1.

The thermoplastic polyester according to the present invention mainly comprises polyester chains of alternating constituent units (I) and (II) as hereinabove defined. Such polyester chains are branched by sporadical intervention of the constituent unit (III) as hereinabove defined. The constituent unit (IV) as hereinabove defined controls the chain length and the extent of branching by its bonding to (II) and (III).

The invention also relates to a thermoplastic polyester which comprises, in addition to the above constituent units, minor amounts of polyfunctional organic compound units (V)-(VIII) as hereinabove defined and, in that case, the polyester may contain an additional amount (hence, in total, a larger amount) of (III) as necessary. The thermoplastic polyester according to the invention is further illustrated hereinbelow.

The main constituent units of the polyester according to the invention are (I) and (II). The repeatedly occurring units represented by formula (I) may be the same or different in one and the same polyester molecule and each is a unit derived from a dicarboxylic acid selected from the class consisting of terephthalic acid, isophthalic acid, orthophthalic acid and straight-chained aliphatic dicarboxylic acids containing 4–10 carbon atoms, such as succinic acid, adipic acid, azelaic acid and sebacic acid. The repeating units represented by formula (II) also may be the same or different and each is a unit derived from a diol selected from the class consisting of aliphatic diols containing 2–10 carbon atoms, such as ethylene glycol, trimethylene glycol, 1,4-butanediol, pentamethylene glycol, 1,6-hexanediol, 3-methyl-1,5-pentanediol, 1,8-octanediol, 1,10-decanediol, diethylene glycol and triethylene glycol, and alicyclic diols containing 6–8 carbon atoms, such as cyclohexanediol and cyclohexanedimethanol. It is necessary that such principal constituent units (I) and (II) should be present in the polyester of the invention substantially in the molar ratio of 1:1 so that both the units can form a polyester chain comprising a repeating unit represented by the formula

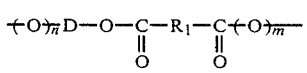

in which both the units are united together by an ester bond. Since such polyester chain is an essential element constituting the polyester of the present invention, the chain is important in providing the polyester of the invention with the same excellent physical properties (e.g. mechanical strength) as those of the conventional polyester species. By adequate selection of the dicarboxylic acid unit (I) and the diol unit (II), it is possible to provide the polyester of the invention with those physical properties which are desired for a certain specific purpose or use thereof. In using the polyester of the invention as an adhesive, as hereinafter discussed, the glass transition temperature of the polyester according to the invention should preferably be not higher than 30° C. Such polyester species can be obtained, for example, by increasing the content of the unit derived from an aliphatic dicarboxylic acid as the dicarboxylic acid unit (I) and/or the content of the unit derived from a long-chained diol containing 4 or more carbon atoms as the diol unit (II). For use as a base for laminated articles, the polyester according to the invention should preferably have a glass transition temperature higher than 30° C. and/or a melting point of not lower than 120° C. Such polyester species should preferably, but without limitation, comprise, for instance, terephthalic acid and isophthalic acid units as the dicarboxylic acid units (I) in amounts of not less than 70 mole percent and the remaining 0–30 mole percent, respectively, as the diol units (II), not less than 70 mole percent thereof of a unit derived from ethylene glycol or 1,4-butanediol and the remaining 0–30 mole percent of a unit derived from ethylene glycol (when the main constituent diol is other than ethylene glycol), 1,4-butanediol (when the main constituent diol is other than 1,4-butanediol), 1,4-cyclohexanedimethanol or diethylene glycol, among others.

The aluminum contained in the unit (III) which is one of the constituents of the polyester according to the invention is a trivalent metal element. Of the three valence bonds, at least one is bound to the dicarboxylic acid unit (I) or diol unit (II) via an oxygen atom to form a carboxylate salt bonding of the formula

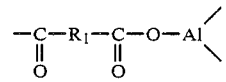

or an alkoxide bonding of the formula —O—D—O—Al<, respectively. Furthermore, as is mentioned below, it is supposed that some aluminum atoms present in the polyester are bonded to the dicarboxylic acid unit (I) or diol unit (II) via an alumina bonding such as

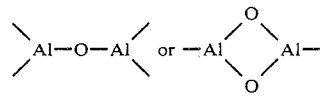

to form a bonding such as

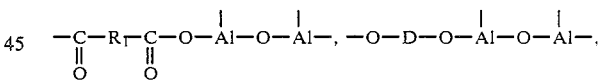

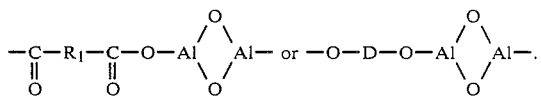

The aluminum atom may also be included in the bonding to the monocarboxylic acid unit (VI), as hereinafter discussed. As for the molar ratio (I):(III), it is necessary that the molar ratio (I):(III) is in the range of 1,000:1 to 100:5. If (III) is less than the above range, the adhesion-increasing effect can hardly be produced. Conversely, the use of (III) in excess of the upper limit of said range may unfavorably cause gelation during polymerization or result in a decreased molecular weight due to the chain termination effect of the monocarboxylic acid added in a fairly large amount for preventing gelation.

The unit represented by (IV), in its repeated occurrence in the polyester of the invention, represents one or more monovalent groups each derived from a monocarboxylic acid selected from the class consisting of an aliphatic or alicyclic monocarboxylic acid containing 6–30 carbon atoms and an aromatic monocarboxylic acid containing 7–20 carbon atoms. Examples of such monocarboxylic acids are mentioned below. The aliphatic monocarboxylic acid includes not only straight-chained saturated acids such as caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachic acid and melissic acid but also unsaturated ones such as oleic acid, linoleic acid, linolenic acid and arachidonic acid and substituted acids such as 12-hydroxystearic acid and 2-ethylhexanoic acid. The alicyclic monocarboxylic acid includes cyclohexanecarboxylic acid, cyclopentanecarboxylic acid, 2-decalincarboxylic acid, etc. The aromatic monocarboxylic acid includes, among others, benzoic acid, phenylacetic acid, diphenylacetic acid, β-naphthoic acid, anthracene-2-carboxylic acid, p-hydroxybenzoic acid, p-ethylbenzoic acid and 1-chloroanthraquinone-2-carboxylic acid. Among these, the preferred acids are straight-chained, saturated, aliphatic monocarboxylic acids, benzoic acid and p-hydroxybenzoic acid, and the most preferred is benzoic acid. These monocarboxylic acid-derived monovalent groups (IV) are bonded either to (II) by the ester bond

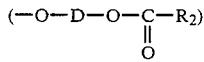

or to (III) by the carboxylate salt bond

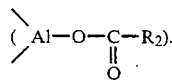

For (IV), it is necessary that the molar ratio (III):(IV) is in the range of 4:1 to 1:10. If (IV) is insufficient as compared with said range, the melt flowability of the product polyester will be adversely affected due to the branch-forming effect of (III) becoming excessive or, in extreme cases, gelation will occur during polymerization to make the subsequent polymerization procedure inoperable, whereby any useful polyester cannot be obtained. Conversely, if (IV) is too abundant as compared with the above range, the chain termination effect of (IV) becomes significant and renders it difficult to produce high polymerization degree polyesters.

The polyester according to the invention has an intrinsic viscosity of not less than 0.5 dl/g, preferably not less than 0.6 dl/g, as determined in a phenol-tetrachloroethane mixed solvent (1:1 in weight ratio) at 30° C. In case the intrinsic viscosity is less than 0.5 dl/g, the mechanical strength of the polyester is unsatisfactory. When subjected to lamination by coextrusion with one or more other thermoplastic resins such as an ethylene-vinyl alcohol copolymer, the polymer according to the invention should preferably have an intrinsic viscosity of not less than 0.7 dl/g, more preferably not less than 0.8 dl/g. There is no particular upper limit to the intrinsic viscosity. However, the polymerization for attaining an intrinsic viscosity of 2.0 dl/g or higher is difficult to conduct.

As is mentioned above, the polyester according to the invention comprises the constituent units (I), (II), (III) and (IV). The dicarboxylic acid unit (I) and/or diol unit (II) may partly (preferably not more than 10 mole percent) be replaced by another dicarboxylic acid and/or diol unit, respectively. Such dicarboxylic acid unit is, for example, the unit derived from a dicarboxylic acid selected from among oxalic acid, hexahydroterephthalic acid, sodium 3,5-dicarboxylbenzene sulfonate, chloroterephthalic acid, bromoterephthalic acid, dichloroterephthalic acid, dibromoterephthalic acid, bromoisophthalic acid, naphthalenedicarboxylic acid (any of its isomers), chloronaphthalenedicarboxylic acid, bromonaphthalenedicarboxylic acid, diphenyl ether dicarboxylic acid and diphenyl-4,4'-dicarboxylic acid. Said diol unit is, for instance, the unit derived from a diol selected from among polyethylene glycol, polytetramethylene glycol, neopentyl glycol, 1,4-bis(β-hydroxyethoxy)benzene, 2,2-bis(p-β-hydroxyethoxyphenyl)propane, bis(p-β-hydroxyethoxyphenyl) sulfone, and the like.

As is mentioned above, the polyester according to the invention to be used in lamination by coextrusion with other thermoplastic resins such as an ethylenevinyl alcohol copolymer should preferably have an intrinsic viscosity of not less than 0.7 dl/g. Such polyester can be produced by conducting the polyester polymerization for a sufficiently long period or performing the polymerization in the presence of a specific amount of a polyfunctional organic compound containing 3 or 4 hydroxyl and/or carboxyl groups in its molecule. When mere extension of the polymerization period cannot result in a satisfactorily high degree of polymerization or when the polymerization period cannot be sufficiently extended because of thermal degradation, the latter measure is effective. Accordingly, the polyester species according to the invention which contains such polyfunctional organic compounds is described hereinbelow.

The polyester of the invention which contains the above-mentioned polyfunctional organic compounds is a thermoplastic polyester which, in addition to the constituent units (I), (II), (III) and (IV), further comprises at least one member of the group consisting of polyvalent residues represented by the following formulas (V), (VI), (VII) and (VIII):

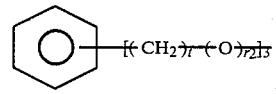

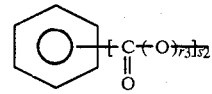

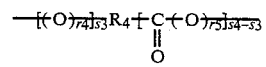

wherein $s_1$, $s_2$ and $s_4$ are each an integer of 3 or 4, $s_3$ is an integer of from 1 to $s_4-1$, $R_3$ is an aliphatic organic residue containing 3 to 9 carbon atoms and having a valence of $s_1$, $R_4$ is an aliphatic organic residue containing 2 to 4 carbon atoms and having a valence of $s_4$, the valence of the benzene nucleus in (VI) is 3, the valence of the benzene nucleus in (VII) is $s_2$, t is an integer of 1 to 4, $r_1$, $r_2$, $r_3$, $r_4$ and $r_5$ are each an integer of 0 or 1, each open bond of the constituent units (V) and (VI) being bonded to a unit selected from the group consisting of (I), (III), (IV), (VII) and (VIII), each open bond of the constituent unit (VII) being bonded to a unit selected from the group consisting of (II), (III), (V), (VI) and (VIII) and each open bond of the constituent unit (VIII) being bonded to a unit selected from the group consisting of (I)-(VIII), each bonding between two constituent units being made via only one oxygen atom, the molar ratio (I):(V)+(VI)+(VII)+(VIII) being in the range of 100:0 to 100:1 and the content of (IV) being the sum of a content corresponding to the molar ratio of (III):(IV) which is 4:1 to 1:10 and a content corresponding to the molar ratio of (IV):(V)+(VI)+(VII)+(VIII) which is in the range of 0:1 to 15:1, said polyester having an intrinsic viscosity of not less than 0.7 dl/g. The formula (V) represents the unit derived from an aliphatic triol or tetraol containing 3-9 carbon atoms, typically glycerol, trimethylolpropane, pentaerythritol, 1,2,6-hexanetriol, trimethylolethane, trimethylolpentane or trimethylolhexane. (VI) is the unit derived from a benzenetrialkanol which contains a straight-chained alkylene group containing 1-4 carbon atoms between the benzene nucleus and each hydroxyl group, such as 1,3,5-trimethylolbenzene, 1,3,5-tripropylolbenzene or 1,3,5-tributylolbenzene. (VII) is the unit derived from a benzenetricarboxylic or benzenetetracarboxylic acid, such as trimellitic acid, trimesic acid or pyromellitic acid. (VIII) is the unit derived from a polyfunctional hydroxycarboxylic acid composed of an organic residue containing 2-4 carbon atoms and a total of 3 or 4 hydroxyl and carboxyl groups, typically malic acid, 3-hydroxyglutaric acid, citric acid or 2,2-dimethylolpropionic acid. The polyester of the invention may contain one or more of such polyfunctional organic compound units (V)-(VIII). The carboxyl-derived valence bonds of the polyfunctional organic compound units, like those of (I), are bound either to the hydroxyl-derived valence bonds of (II), (V), (VI) and (VIII) by ester bonding or to (III) by carboxylate salt bonding. The hydroxyl-derived valence bonds of the polyfunctional organic compound units, like those in (II), are bound either to the carboxyl-derived valence bonds of (I), (IV), (VII) and (VIII) by ester bonding or to (III) by alkoxide bonding. The above polyfunctional organic compound units are preferably contained in the polyester of the invention in a total amount of not more than 1 mole percent based on (I). A total polyfunctional organic compound unit content exceeding such range tends to cause gelation of the product polyesters due to their markedly branched structure or to cause significant chain termination due to the presence of a large amount of the monocarboxylic acid unit (IV), which is additionally used as as to control the degree of branching as mentioned below, and thereby cause a decrease in the attainable molecular weight, so that the desired polyester species can hardly be obtained. The polyester according to the invention contains, as mentioned above, the monocarboxylic acid unit (IV) in an amount corresponding to the (III):(IV) molar ratio, which is in the range of 4:1 to 1:10, for controlling the branch-forming effect of the aluminum atom. When the polyfunctional organic compound units (V)-(VIII) are employed, such amount of (IV) alone may, in some cases, be insufficient for the inhibition of gelation due to the branching-causing effect of the polyfunctional organic compound units. Therefore, the polyester according to the invention, when it contains the polyfunctional organic compound units, may contain, in addition to an amount corresponding to the (III):(IV) molar ratio of 4:1 to 1:10, an additional amount of (IV) corresponding to a number of moles up to 15 times the total number of moles of the polyfunctional organic compound units (V)-(VIII). A still larger amount of (IV) will produce a remarkable polyester chain termination effect, whereby a satisfactorily high degree of polymerization can hardly be obtained.

In some cases, a haze is formed in the polyester according to the present invention. It is considered that the haze is caused by crystallization of the polyester around room temperature. For the purpose of preventing the haze, it is effective to add a powdered silica of 150 to 450 Angstroms, mean particle size, being miscible with water or alcohols in the reaction system. A colloidal silica is ordinarily used as the above-mentioned silica which is a dispersion of the powdered silica in water or alcohols (e.g. SNOWTEX-20L (trade mark) manufactured by Nissan Chemical Industries, Ltd.). The silica is preferably contained in the range of 0.1 to 5 weight % (more preferably 0.2 to 1 weight %) based on the polyester as the solid component.

A method of producing the polyester according to the invention is described below. The polyester of the invention can be produced by polycondensing at least one dicarboxylic acid capable of providing the constituent unit (I) or an ester-forming derivative thereof with at least one diol capable of providing the constituent unit (II) in the presence of an aluminum compound of the formula given below or in the presence of said aluminum compound and a monocarboxylic acid serving as the source of the constituent unit (IV) or an ester thereof:

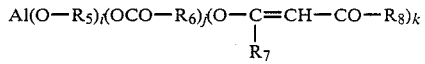

wherein $R_5$ is a monovalent group derived from an aliphatic, alicyclic or monocyclic aromatic alcohol by removal of the hydroxyl group therefrom, preferably a lower alkyl group such as propyl or butyl, $R_6$ is the same as the above-mentioned $R_2$, a monovalent group derived from an aliphatic monocarboxylic acid containing 1 to 5 carbon atoms, which may optionally be substituted, for example, by a hydroxyl group, by removal of the carboxyl group therefrom or a monovalent group derived from a monoester or mono alkali metal salt of a dicarboxylic acid corresponding to $R_2COOH$ or to an aliphatic monocarboxylic acid containing 1 to 5 carbon atoms by removal of the free carboxyl group, preferably a phenyl or p-hydroxyphenyl group or a straight-chained alkyl group containing 5 to 17 carbon atoms, more preferably a phenyl group, $R_7$ is a methyl or phenyl group, $R_8$ is a methyl or phenyl group or a monovalent group derived from an aliphatic alcohol by removal of the hydroxyl proton therefrom, i, j and k each represents the average number of respective groups bonded to the aluminum atom, $i+j+k=3$ and $0 \leq i \leq 2$, $0 \leq j \leq 3$ and $0 \leq k \leq 3$.

Although any of the aluminum compounds having the above structure can be used in the practice of the invention, a compound approximately represented by the formula

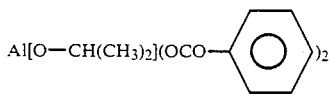

is preferred.

The above aluminum compound is preferably added to the reaction system at a temperature of 180°–300° C. (more preferably 180°–250° C.) after the esterification reaction between the dicarboxylic acid and the diol has advanced to such an extent that the carboxylic group content in the reaction system is already slight or when the transesterification between the dicarboxylate ester and the diol is almost complete. In particular, the above aluminum compound is more preferably added after completion of the transesterification since it may inactivate the conventional transesterification catalysts. In a preferred mode of addition, it is added in the form of a solution or suspension in the diol. The above aluminum compound can be produced by various methods known to those skilled in the art. One method will be illustrated in the examples hereinafter. When a monocarboxylic acid or an ester thereof capable of providing the constituent unit (IV) and/or polyfunctional organic compounds capable of providing (V)–(VIII) [polyhydric alcohols, polybasic carboxylic acids and polyfunctional hydroxycarboxylic acids corresponding to (V)–(VIII), inclusive of esters and cyclic acid anhydrides thereof when carboxyl groups are contained therein] are used together with the above aluminum compound, they are added to the reaction system when the raw materials are charged or prior to the esterification or transesterification reaction. When a transesterification process is used, they may be added immediately after the transesterification reaction.

The esterification reaction of the dicarboxylic acid with the diol or the transesterification reaction between the dicarboxylic acid ester and the diol and the subsequent polycondensation reaction can be carried out under the conventional polyester polymerization conditions. Thus, for example, the esterification reaction of the dicarboxylic acid with the diol or the transesterification between a dialkyl ester of the dicarboxylic acid and the diol is conducted at a temperature of 180°–230° C. in the absence or presence of a catalyst such as a zinc, calcium or manganese compound, and then the polycondensation is effected at a temperature of 260°–300° C. and an absolute pressure of 1 mmHg or below using an antimony, titanium or germanium compound or the like as a catalyst. In that case, a phosphoric acid compound may be added as a heat stabilizer.

As stated above, the addition of the colloidal silica is effective for preventing the haze of the polyesters according to the present invention due to crystallization. In this case, it is preferred that the colloidal silica is mixed with the diol component, one of the raw materials, and then added to the reaction system.

Upon addition of the above-mentioned aluminum compound to the reaction system, the $R_5$—O— and

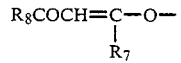

moieties for the most part react with and are bound to the dicarboxylic acid or diol component with liberation of the corresponding alcohol $R_5OH$ and β-diketone or keto acid $R_8COCH_2COR_7$, respectively, which are transferred to the distillate fraction. When the $R_6$ group is identical with $R_2$ in formula (IV), the $R_6COO$— group partly remains bound to Al in the product polyester and the remaining portion is eliminated as a result of the exchange reaction with the dicarboxylic acid and bound to the terminus of the polyester molecule. When $R_6$ is a group derived from a monocarboxylic acid containing not more than 5 carbon atoms by removal of the carboxyl group therefrom, it is transferred for the most part to the distillate in the form of the corresponding monocarboxylic acid or an alkyl ester thereof. In this way, Al is bound to the polyester molecule in the middle and/or at the end thereof either directly by alkoxide or carboxylic acid salt bonding or indirectly via an interposing alumina bond. In this manner, most of the Al added is bound to the polyester and accordingly, the above-mentioned aluminum compound is suitably added in an amount of 0.1 to 5 moles per 100 moles of the dicarboxylic acid. The monocarboxylic acid which is the material for providing the constituent unit (IV) is preferably added in an amount such that the sum of the number of moles of the $R_2COO$— group in the aluminum compound and the number of moles of the monocarboxylic acid ($R_2COOH$) or an ester thereof to be added as it is is 0.25–10 times the number of moles of Al. Furthermore, when polyfunctional organic compounds for providing the polyfunctional organic compound units (V)–(VIII) are added, they are for the most part introduced into the polyester and therefore they are preferably added in a total amount of not more than 1 mole per 100 moles of the dicarboxylic acid. When, correspondingly, the monocarboxylic acid ($R_2COOH$) or an ester thereof is added additionally, it is preferably added in an amount of not more than 15 moles per mole of the above polyfunctional organic compounds in total.

That the above method gives the polyester of the invention is confirmed by the following facts:

(1) That the content of the $R_5$—O— and

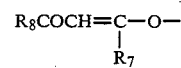

groups in the aluminum compound almost corresponds to the amounts of $R_5OH$ and $R_8COCH_2COR_7$ detected in the distillate, respectively;

(2) That microanalysis by 400 MHz high resolution nuclear magnetic resonance (NMR) spectrometry reveals that the $R_2COO$— group is present in the polyester in an amount corresponding to the sum of the amount of $R_2COO$— in the aluminum compound added and the amount of the monocarboxylic acid or the ester thereof separately added;

(3) That X-ray fluorometry shows that the Al atoms is present in the polyester in an amount almost equal to the amount added;

(4) That Fourier transform infrared absorption (FT-IR) spectrophotometry of the polyester indicates that new absorptions which cannot be observed with the conventional polyesters are found at 1600 cm$^{-1}$ and 590 cm$^{-1}$. The former absorption is an absorption of a carboxylic acid aluminum salt, as described, for example, in Analytical Chemistry, volume 24, page 635 (1952). The latter absorption is an absorption of a metal alkoxide, as taught in D. M. Adams: "Metal-Ligand and Related Vibrations", Edward Armold (London). Since alumina (Al$_2$O$_3$) shows an absorption at about 590 cm$^{-1}$, the absorption of alumina bonds existing in part in the polyester is supposedly overlapping with said alkoxide absorption. Alumina (Al$_2$O$_3$) which has a macromolecular structure constructed by alumina bonding is not dissolved uniformly in the polyester in the molten state but renders the molten polyester opaque. On the other hand, the polyester according to the invention is transparent in the molten state. Therefore, it is supposed that the above macromolecular alumina structure as resulting from alumina bond chain and network formation is absent in the polyester of the invention, and even if a consecutive repetition of the constituent unit (III) is present, the number of repetitions is presumably small.

Japanese Patent Publication No. 41-9,808 and Japanese Patent Publication No. 48-20,014 disclose polyester species with aluminum atoms introduced therein. However, the polyester of the invention is quite different from them in structure and characteristics. The polyester disclosed in Japanese Patent Publication No. 41-9,808 is the one modified with aluminum chloride or an aluminum alkoxide. When the former modifier is used, the aluminum atoms introduced into the polyester are supposed to have Al-Cl bonding. Such Al-Cl bond-containing polyester does not show adhesiveness. The polyesters obtained by using aluminum alkoxides as modifiers contain insoluble particles in large amounts and do not show adhesiveness. Japanese Patent Publication No. 48-20,014 discloses an adhesive composition for the adhesion of aluminum sheets which is prepared by adding an organic aluminum compound to a solution of a polyester in an organic solvent so as to cause crosslinking. Since such composition is a heat-curable adhesive composition in which aluminum-caused crosslinking proceeds upon heating, it can hardly be used in melt-adhesion to adherends or in subjecting laminated articles produced by using said adhesive to thermoforming as the secondary forming. In other words, the use of said composition is restricted from the viewpoint of molding or forming when thermoplastic resins are the adherends. The present invention has made it possible to produce for the first time those polyester species which have adhesiveness as well as heat melt flowability by introducing both the trivalent aluminum atom which is capable of causing crosslinking and the monocarboxylic acid unit into the polyester molecule.

The thus-obtained polyester according to the invention is superior to the conventional polyesters in adhesion to hydroxyl- and/or carboxyl-containing polymers and to metals and is of course excellent in adhesion to polyesters. Furthermore, it is harmless to humans and other living things, not very susceptible to thermal degradation or discoloration in the molten state, and has good stretchability. Therefore, it is very useful as a constituent material of various laminated articles or as an adhesive for such articles.

The polyester according to the invention is used mainly as an adhesive or a base for laminated articles. This mode of practice is described below in more detail.

For use as an adhesive, the polyester according to the invention preferably has a glass transition temperature of not higher than 30° C., because such polyester has, in addition to the affinity for polymers containing polar groups such as hydroxyl and/or carboxyl groups in the molecule as provided by the introduction of aluminum atoms, an improved adhesiveness due to the flexibility of the polyester itself. Preferred adherends to the adhesive comprising the polyester according to the invention are polymers containing hydroxyl and/or carboxyl groups in the molecule, polyesters and various metals since said adhesive produces firm and strong adhesion with such materials. As the above-mentioned hydroxyl- and/or carboxyl-containing polymers, there may be mentioned, for example, such hydroxyl-containing polymers as ethylene-vinyl alcohol copolymer, vinyl alcohol homo- and co-polymers and cellulose, and such carboxyl-containing polymers as maleic anhydride-modified polyethylene, maleic anhydride-modified ethylene-vinyl acetate copolymer, ethylene-acrylic acid copolymer and other olefinic polymers, each containing pendent carboxyl groups or anhydride rings derived therefrom in an amount of 0.1–10 mole percent (on the constituent unit basis). The carboxyl groups in the above-mentioned polymers containing carboxyl groups in the molecule may partially take the form of a cyclic anhydride or metal salt (e.g., sodium, potassium or calcium salt).

The adhesive comprising the polyester according to the invention can be used by any technique such as the extrusion lamination method comprising applying said adhesive in the molten state to a molded adherend (made of any of various resins, metals, etc.) followed by joining with the other adherend, the coextrusion method comprising simultaneously melting and extruding the adhesive together with both adherends for lamination, the heat lamination method comprising interposing the adhesive in the powder, film or chip-like form between adherends followed by heating under pressure and the dry lamination method comprising dissolving the adhesive in an adequate organic solvent (e.g. halogenated hydrocarbon, ether or ester), applying the solution to one adherend, removing the solvent and joining with the other adherend followed by heating under pressure.

In this manner, the use of the polyester according to the invention as an adhesive can provide various laminated articles composed of at least three layers with the layer (A) of said adhesive interposing between two adherend layers (B) and (C). [(B) and (C) may be of the same material or different materials.] Thus, the laminated articles may have a three-layer construction represented by (B)/(A)/(C). In addition, they may have more complicated laminated constructions comprising such three-layer construction as part thereof, namely constructions comprising four or more layers, such as (B)/(A)/(C)/(D) [the material of (D) being different from that of (C); e.g. polyethylene, polypropylene, polyvinylidene chloride, nylon], (B)/(A)/(C)/(A)/(E) [the material of (E) being the same as or different from that of (B) and/or (C)] and (B)/(A)/(C)/(A)/(E)/(D), with a very large number of other various combinations.

Among the laminates having the above constructions, particularly useful are laminates comprising at least three layers made by adhesion of a conventional polyester (base) material and an ethylene-vinyl alcohol copolymer with the polyester adhesive according to the invention, such as those having the constructions "conventional polyester (base)/polyester of the invention (adhesive)/ethylene-vinyl alcohol copolymer", "conventional polyester (base)/polyester of the invention (adhesive)/ethylene-vinyl alcohol copolymer/polyester of the invention (adhesive)/conventional polyester (base)" and "conventional polyester (base)/polyester of the invention (adhesive)/ethylene-vinyl alcohol copolymer/polyester of the invention (adhesive)/conventional polyester (base)/heat-sealable resin", for reasons of their excellent mechanical strength, water resistance, gas barrier function and moldability or processability, among others. The above-mentioned conventional polyester (base) layer offers the mechanical strength and water resistance whereas the ethylene-vinyl alcohol copolymer layer serves as the gas barrier. In enjoying the advantages of both the resins which are complementary to each other, more advantageous are five-layered laminates having the construction "conventional polyester (base)/ polyester of the invention (adhesive)/ethylene-vinyl alcohol copolymer/polyester of the invention (adhesive)/ conventional polyester (base)" and laminates comprising 6 or more layers with one or more other layers laminated to said construction.

Said conventional polyesters each constituting a base are required to be self-supporting and have mechanical strength, shock resistance, water resistance and other properties. Therefore, polyethylene terephthalate, polybutylene terephthalate and copolyesters in which terephthalic acid accounts for not less than 80 mole percent of the dicarboxylic acid component and ethylene glycol or 1,4-butanediol accounts for not less than 70 mole percent of the diol component are preferred, and preferred comonomer components are isophthalic acid, 1,4-cyclohexanedimethanol and diethylene glycol, among others. Especially preferred are polyethylene terephthalate and copolyesters in which ethylene terephthalate units account for not less than 80 mole percent of the repeating units. The ethylene-vinyl alcohol copolymer (saponified ethylene-vinyl acetate copolymer) is required to serve as a gas barrier, hence preferably has an ethylene content of 20-60 mole percent (more preferably 25-50 mole percent) and a saponification degree of not less than 95 mole percent (more preferably not less than 98 mole percent).

When the polyester according to the invention is to be used as a base for laminates, it is preferable from the mechanical strength and other viewpoints that such polyester has a glass transition temperature of not lower than 30° C. and/or, if it is crystalline, a melting point of not lower than 120° C. Polyester species having such glass transition temperature and melting point can be obtained by selecting the dicarboxylic acid unit (I) and diol unit (II) in the main among the constituent units. Such polyester has adhesiveness to polymers containing carboxyl groups in the molecule as well as good mechanical properties like those of the conventional polyesters. Therefore, the use of the polyester according to the invention as a base (F) gives various laminates, such as the one made by laminating a carboxyl-containing polymer (G) to said base (f) or the one made by further laminating another layer thereto. Examples of the layer construction are (F)/(G), (F)/(G)/(H) [the material of (H) being the same as or different from the material of (F)], (G)/(F)/(I) [the material of (I) being the same as or different from the material of (G)], (I)/(F)/(G)/(H), (F)/(G)/(H)/(G)/(F) and (G)/(F)/(I)/(F)/(G).

The carboxyl-containing polymer includes those mentioned hereinbefore. Since such polymer serves as a good adhesive to ethylene-vinyl alcohol copolymers, there can be obtained polyester/ethylene-vinyl alcohol copolymer laminates with the carboxyl-containing polymer interposed therebetween. Thus, there can be obtained laminates having mechanical strength and at the same time gas barrier function, such as those having the construction "polyester of the invention/carboxyl-containing polymer/ethylene-vinyl alcohol copolymer" and "polyester of the invention/carboxyl-containing polymer/ethylene-vinyl alcohol copolymer/carboxyl-containing polymer/polyester of the invention". Such laminates can be produced by various methods, such as extrusion lamination, coextrusion, dry lamination and heat lamination. As the ethylene-vinyl alcohol copolymer, there may be used those species mentioned hereinbefore.

By using the polyester according to the invention as an adhesive or a base, there can be obtained various laminates, as mentioned above. The laminates may have the form of a film, sheet, tube or cup, for instance. More complicated forms such as bottles can be obtained by a secondary processing following the production of these laminates. Each layer of these laminates may contain various additives (e.g. pigments, dyes, antioxidants, ultraviolet stabilizers, fillers, nucleating agents), as necessary. Biaxial stretching of the thus-obtained laminates increases or improves their mechanical strength, gas barrier function and other properties. Thus, for instance, biaxially stretched laminate films made from laminated films, biaxially stretched laminate cups or trays made from laminated sheets by pressure vacuum forming or draw forming, for instance, and biaxially stretched laminated hollow vessels (bottles) made from laminated hollow bodies (e.g. tubes, cups, closed-end parisons) by blow molding or stretch blow molding, for instance, are preferred embodiments in which the polyester of the invention is used. In accordance with a typical embodiment of the invention, there are provided, among others, laminated hollow vessels made by laminating the polyester and an ethylene-vinyl alcohol copolymer. Such hollow vessels can be produced by subjecting tubes or closed-end parisons comprising at least three layers and having, for example, the construction "conventional polyester (base)/polyester of the invention (adhesive)/ethylene-vinyl alcohol copolymer" or "polyester of the invention (base)/carboxyl-containing polymer/ethylene-vinyl alcohol copolymer" to blow molding or stretch blow molding by the conventional method. Preferred layer constructions for producing hollow vessels are "conventional polyester (base)/polyester of the invention (adhesive)/ethylene-vinyl alcohol copolymer/polyester of the invention (adhesive)/conventional polyester (base)" and "polyester of the invention (base)/carboxyl-containing polymer/ethylene-vinyl alcohol copolymer/carboxyl-containing polymer/polyester of the invention (base)". The coextrusion method is favored as the method of forming said laminated tubes and other laminates from the productivity viewpoint, and the polyester according to the invention, when processed by said method, should preferably have an intrinsic viscosity of not less than 0.7 dl/g (more preferably not less than 0.8 dl/g). When the intrinsic viscosity is lower than said value, it does not conform to the viscosity of an ethylene-vinyl alcohol copolymer generally used for forming purposes, so that lamination by coextrusion in a uniform thickness is difficult to effect. In cases where laminates obtained by using the polyester of the invention as an adhesive are biaxially stretched, the polyester should preferably be a noncrystalline one or a crystalline one having a melting point not higher than 120° C. for the laminates generally biaxially stretched at a stretching temperature of 80° C. to 120° C. The thus-obtained hollow vessels are preferred in that they are free of irregularity in thickness or interlayer separation and have good mechanical strength, shock resistance, water resistance, gas barrier function and transparency and that their use as the vessels for drinks such as fruit juices, carbonated drinks and beer improves the long-period preservability or shelf life of the contents.

The following examples illustrate the invention in more detail. However, they are by no means limitative of the invention.

The melting point of each crystalline polyester species as referred to or reported herein is the value determined on a differential scanning calorimeter (DSC). The values appearing in the examples were also determined by this method. Thus, 5 mg of a quenched film was heated from room temperature at a rate of 20° C./minute and the peak temperature at which crystals melted was regarded as the melting point. The glass transition temperature of the polyester is also the value determined on a DSC. The data given in the examples are also the values determined in the same manner. The rate of temperature raising was 20° C./minute.

EXAMPLE 1

Preparation of the aluminum compound

Hexylene glycol (100 ml) was put in a 300-ml round-bottomed flask fitted with nitrogen gas inlet tubing, stirrer and condenser and with the introduction of nitrogen gas and at room temperature, 0.10 mole of aluminum isopropoxide powder was added and stirred. Then, 0.05 mole of caprylic acid and 0.15 mole of p-hydroxybenzoic acid were added and under stirring, the mixture was heated to 100° C. in an oil bath. With this temperature maintained, the reaction was continued for 15 minutes. Thereafter, 0.10 mole of acetylacetone was added and the reaction was continued at 100° C. for 15 minutes to prepare an aluminum compound solution.

The infrared absorption spectrum of this solution showed that while a slight absorption of unreacted carboxylic acids was observed at 1700 cm$^{-1}$, the absorption of aluminum carboxylate at 1600 cm$^{-1}$ and that of the acetylacetone complex salt at 1540 cm$^{-1}$ were both intensely observed, indicating that the alcoholate bonds were converted to carboxylate and acetylacetonate complex bonds.

Polymerization

A 300 ml-three-necked flask fitted with nitrogen gas inlet tubing, stirrer and condenser was charged with 100 g of dimethyl terephthalate, 68 g of ethylene glycol and 40 mg of zinc acetate, and the mixture was heated at 200° C. in a nitrogen gas stream for 3 hours to effect the transesterification reaction. Then, 25 μl of tributyl phosphate and 40 mg of antimony trioxide were added at 200° C. Further, the above-mentioned aluminum compound solution was added thereto at a concentration of 0.52 mole of aluminum atom to each 100 moles of dimethyl terephthalate so as to dissolve the aluminum compound in the contents of the flask. The temperature of the oil bath was increased to 260° C. and then, under gradual decomposition, to 280° C. and the polymerization was conducted at a reduced pressure of 0.1 mmHg for 90 minutes, whereby a light-green polymer was obtained. This polyester in the molten state was transparent and had an intrinsic viscosity [η] of 0.71 dl/g. It had a glass transition temperature of 74° C. and a melting point of 252° C.

The NMR spectrum of the above polyester is shown in FIG. 1. The spectrum shows peaks assignable to the methylene protons of caprylic acid at 0.90 ppm and the phenyl protons of p-hydroxybenzoic acid at 6.65 ppm. The caprylic acid content of the polymer as determined from this spectrum was slightly less than the amount calculated from the charged amount but the p-hydroxybenzoic acid content was in substantial agreement with the charge.

Figure 2:
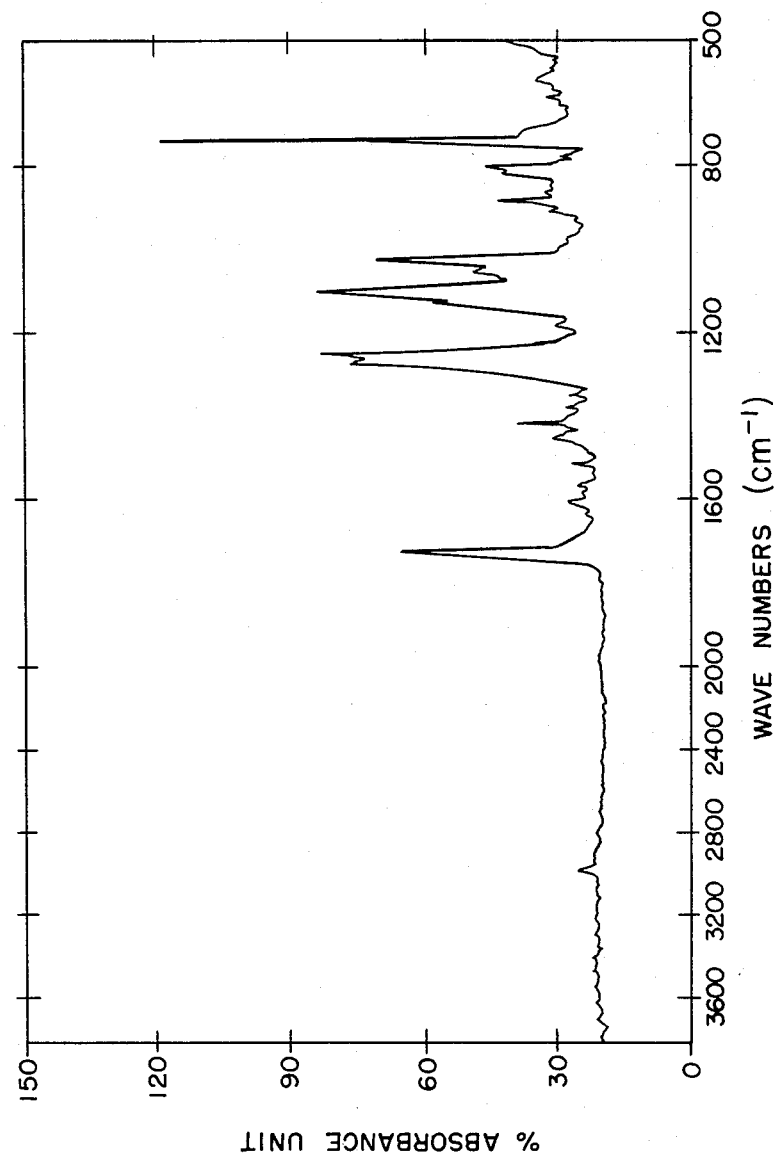
FIG. 2, FIG. 4, FIG. 5 and FIG. 6 show the infrared absorption spectra of the polyesters obtained in Examples 1, 2, 8 and 18, respectively.
Figure 3:
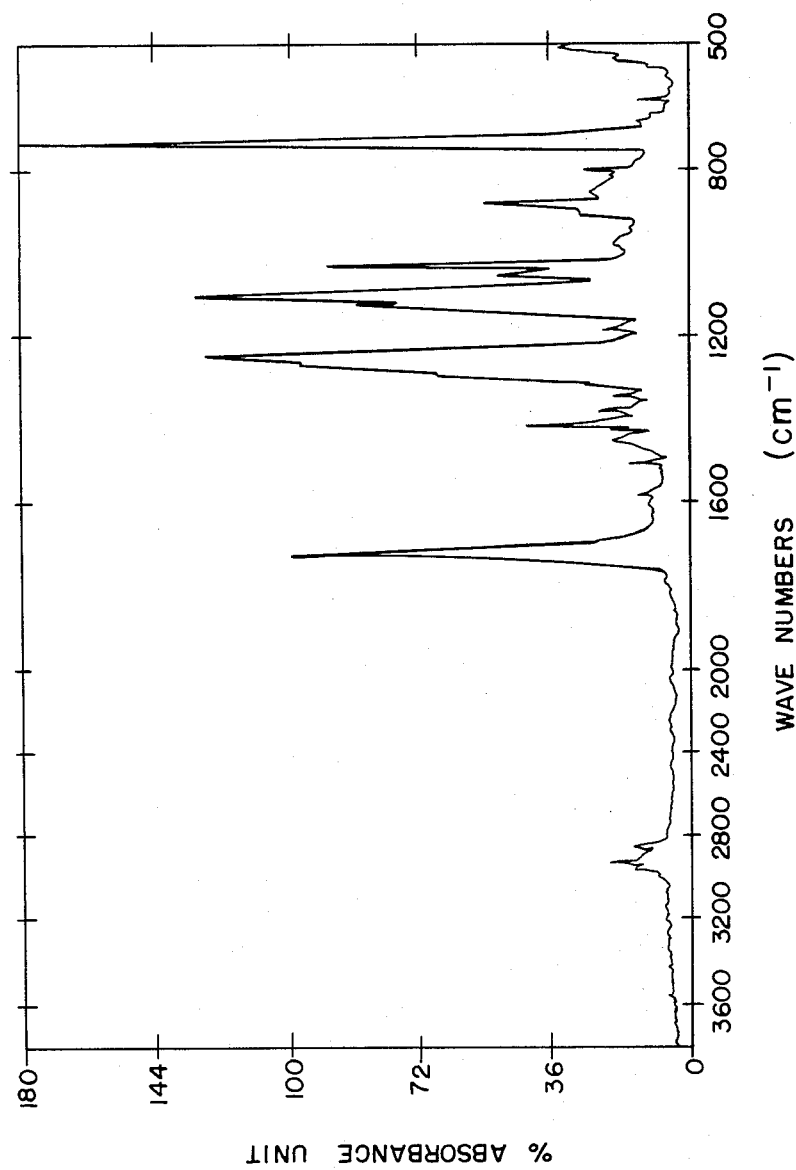
FIG. 3 shows the infrared absorption spectrum of polyethylene terephthalate.

The FT-IR spectrum of this polyester is shown in FIG. 2. Weak absorptions are noted at 1600 cm$^{-1}$ and 590 cm$^{-1}$, which are not found in the spectrum of polyethylene terephthalate in FIG. 3. As mentioned in the detailed description, the absorption at 1600 cm$^{-1}$ is due to the aluminum carboxylate and that at 590 cm$^{-1}$ is due to the aluminum alcoholate and alumina bonds.

EXAMPLE 2

A 300 ml-three-necked flask fitted with nitrogen gas inlet tubing, stirrer and condenser was charged with 100 g of dimethyl terephthalate, 68 g of ethylene glycol, 0.88 g of methyl benzoate and 40 mg of zinc acetate and the contents were heated at 200° C. in a nigrogen gas stream for 3 hours to effect the transesterification reaction. Then, 25 μl of tributyl phosphate and 40 mg of antimony trioxide were added, followed by addition and dissolution of aluminum acetylacetonate in a ratio of 0.50 mole to 100 moles of dimethyl terephthalate. The temperature of the oil bath was increased to 260° C. and then, under gradual decompression, to 280° C. and the polymerization reaction was conducted at a reduced pressure of 0.1 mmHg for 90 minutes, whereby a light-yellow polymer was obtained. This polyester in molten state was transparent and had an intrinsic viscosity [η] of 0.70 dl/g. The glass transition temperature and melting point of the polyester were 78° C. and 253° C., respectively.

Figure 4:
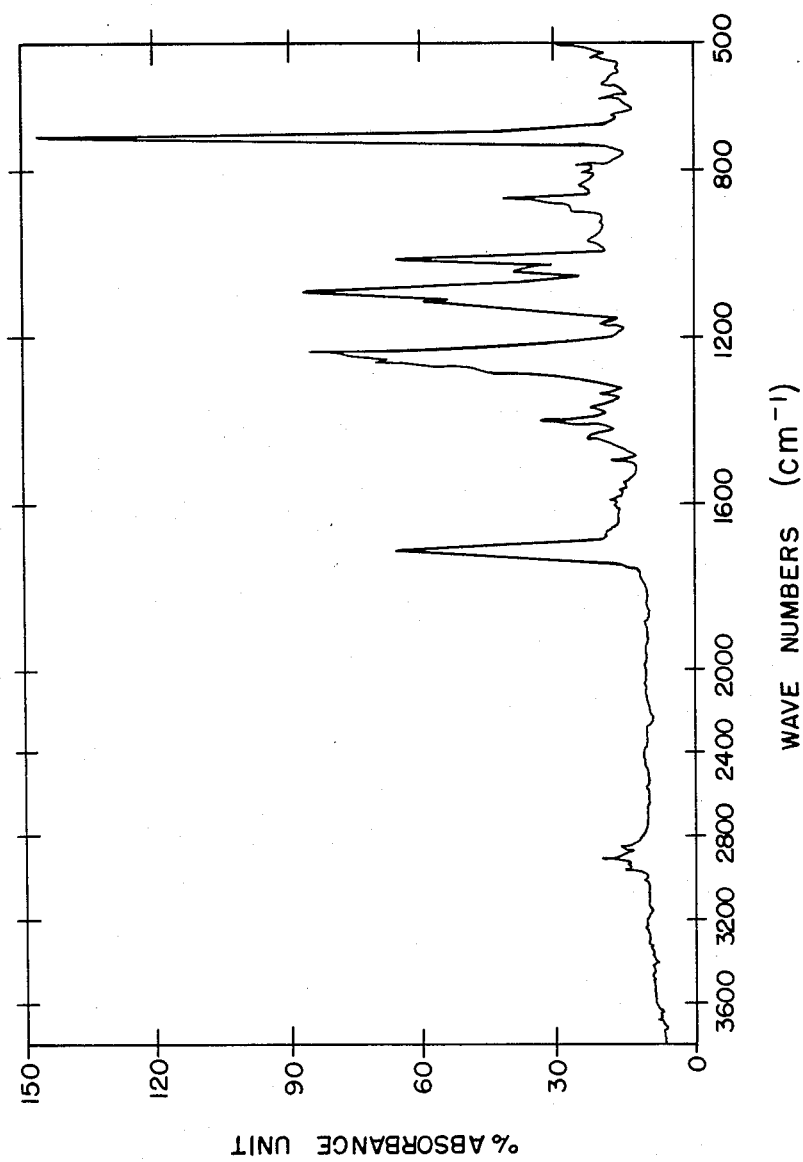

The FT-IR spectrum of this polyester is shown in FIG. 4, which indicates an absorption of aluminum carboxylate at 1600 cm$^{-1}$ and an absorption of aluminum alcoholate and alumina bonds at 590 cm$^{-1}$.

Analysis of the NMR spectrum of the distillate obtained during the period after the transesterification reaction till completion of polymerization of this polyester showed a signal assignable to acetylacetone and a quantitative assay of this fraction gave a result substantially corresponding to the amount of acetylacetone in the aluminum acetylacetonate added. The above findings indicate that the aluminum acetylacetonate released acetylacetone in the course of polymerization to form the aluminum carboxylate, aluminum alcoholate and Al—O—Al bonds.

EXAMPLE 3

Preparation of the aluminum compound

Hexylene glycol (100 ml) was placed in the equipment of Example 1 under a nitrogen gas supply and 0.10 mole of aluminum isopropoxide was added and stirred. Then, 0.05 mole of caprylic acid and 0.15 mole of p-hydroxybenzoic acid were added and under stirring the mixture was heated to 100° C. in an oil bath. At this constant temperature, the reaction was carried out for 15 minutes. Then, 0.10 mole of ethyl acetoacetate was added and the reaction was further conducted at 100° C. for 15 minutes to prepare an aluminum compound solution.

Polymerization

In the same manner as Example 1, the transesterification reaction between dimethyl terephthalate and ethylene glycol was conducted followed by addition of 25 μl of tributyl phosphate and 40 mg of antimony trioxide. Then, the above-mentioned aluminum compound solution was added in such a proportion that the level of addition of aluminum in terms of Al atom was 0.52 mole per 100 moles of dimethyl terephthalate. The temperature was increased to 260° C., and under gradual decompression, to 280° C. The system was further decompressed to 0.1 mmHg and the polymerization reaction was conducted at a vacuum of 0.1 mmHg for 90 minutes. The resulting polyester was light-yellow and, in the molten state, was transparent and completely free from insoluble matter. The intrinsic viscosity $[\theta]$ of this polyester was 0.76 dl/g. The glass transition temperature and melting point of this polyester were 75° C. and 251° C., respectively.

EXAMPLE 4

A 300 ml three-necked flask fitted with nitrogen gas inlet tubing, stirrer and condenser was charged with 70 g of dimethyl terephthalate, 30 g of dimethyl isophthalate, 68 g of ethylene glycol and 40 mg of zinc acetate and the transesterification reaction was conducted at 200° C. in a nitrogen gas steam for 3 hours. Then, 25 μl of tributyl phosphate and 40 mg of antimony trioxide were added, and the aluminum compound solution prepared in Example 1 was added in a proportion such that the level of addition of aluminum in terms of Al atom was 0.52 mole to each 100 moles of dimethyl terephthalate and dimethyl isophtalate combined. The polymerization reaction was conducted under the same conditions of Example 1. The resulting polymer was a light-yellowish green transparent glassy polymer resembling glass. The DSC glass transition temperature of this polymer was about 65° C. but being amorphous, its melting point could not be determined. The intrinsic viscosity $[\eta]$ of this polyester was 0.72 dl/g.

EXAMPLE 5

A 300 ml round-bottomed flask fitted with nitrogen gas inlet tubing, sitrrer and condenser was charged with 97 g of dimethyl terephthalate, 0.85 g of methyl benzoate, 57.4 g of ethylene glycol, 25.2 g of 1,4-cyclohexanedimethanol and 40 mg of zinc acetate, and the contents were heated at 200° C. in a nitrogen gas stream for 3 hours to effect the transesterification reaction. Then, 25 μl of tributyl phosphate, 40 mg of antimony trioxide and 1.0 g of aluminum acetylacetonate were added and the mixture was heated to 260° C. and, under gradual decompression, to 280° C. At a vacuum of about 0.1 mmHg, the polymerization reaction was conducted for 90 minutes. The resulting polymer was a light-green glassy polymer which, in the molten state, was transparent. The intrinsic viscosity $[\eta]$ of this polymer was 0.68 dl/g. The DSC glass transition temperature of the polymer was 78° C. but being amorphous, its melting point was not determined.

EXAMPLE 6

A polymerization vessel similar to that used in Example 1 was charged with 100 g of dimethyl terephthalate, 100 g of 1,4-butanediol and a solution of tetrabutyl titanate in n-hexane (tetrabutyl titanate 40 mg), and the transesterification reaction was conducted at 180° C. for 1 hour, 200° C. for 1 hour and 220° C. for 1 hour. Then, the same aluminum compound solution as used in Example 1 was added so that the level of addition of aluminum was 0.2 mole to each 100 mole of dimethyl terephthalate, and the mixture was heated to 260° C. and, under gradual decompression, to 270° C. The pressure was further reduced to about 0.1 mmHg, at which pressure the polymerization reaction was conducted for 90 minutes. The resulting polyester was a light-yellow crystalline polyester. Being a highly crystalline compound, its glass transition temperature was not determined but its melting point was 221° C. The polyester in molten state was transparent and had an intrinsic viscosity $[\eta]$ of 0.73 dl/g.

EXAMPLE 7

A reaction vessel similar to that described in Example 1 was charged with 64.0 g of bis-β-hydroxyethyl terephthalate, 25.0 g of succinic anhydride, 15.5 g of ethylene glycol and 14.9 g of diethylene glycol, and the contents were reacted at 200° C. in a nitrogen gas stream for 1 hour. The temperature was then increased to 215° C. and the reaction was further continued for 1 hour. Thereafter, 25 μl of tributyl phosphate and 36 mg of antimony trioxide were added and the same aluminum compound solution as used in Example 1 was added so that the level of addition of atomic aluminum was 0.50 mole per 100 moles of the dicarboxylic acid component. The temperature was increased to 260° C. and, under gradual decompression, further to 275° C. The pressure was finally reduced to about 0.1 mmHg and the polymerization reaction was conducted for 90 minutes. The resulting polyester was a light-yellow polymer which was transparent and resembled hard rubber at room temperature. The glass transition temperature of the polymer was 27° C. but being amorphous, its melting point was not determined. The intrinsic viscosity $[\eta]$ of this polyester was 0.64 dl/g.

EXAMPLE 8

Figure 5:
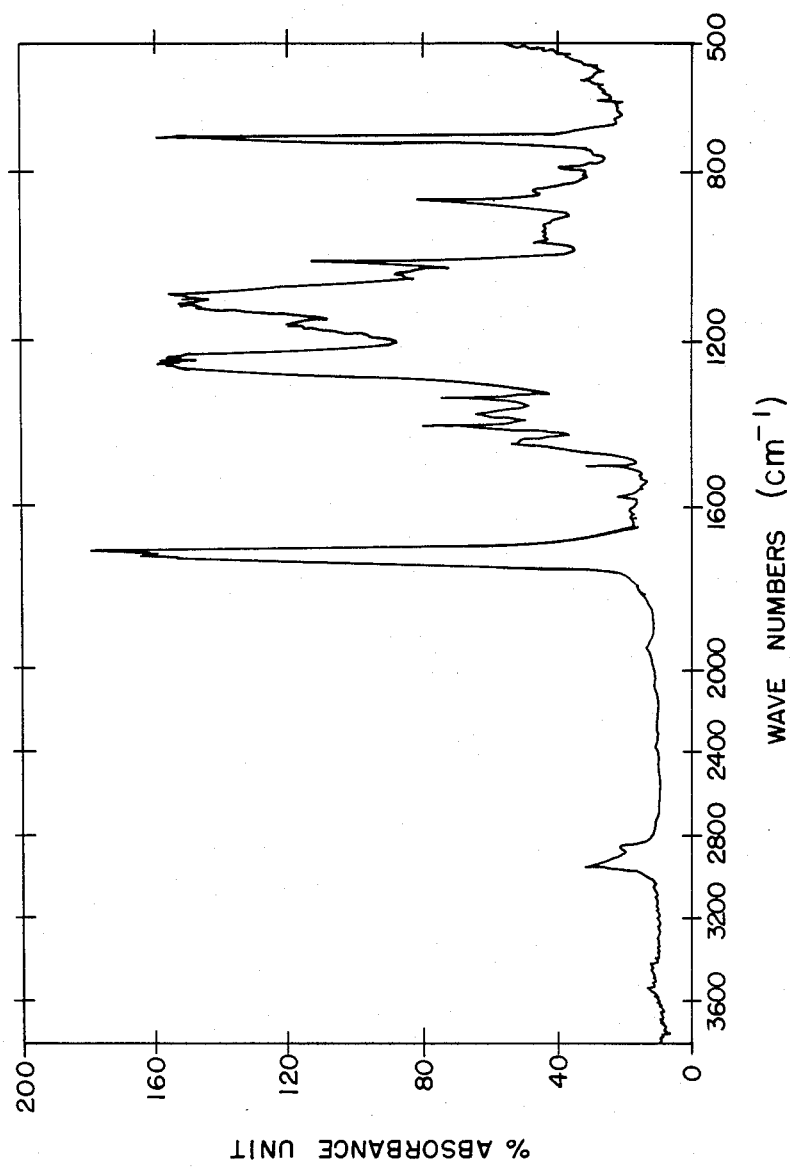

A polymerization vessel similar to that used in Example 1 was charged with 64 g of bis-β-hydroxyethyl terephthalate, 36.5 g of adipic acid, 15.5 g of ethylene glycol and 14.9 g of diethylene glycol, and the esterification reaction was conducted at 200° C. in a nitrogen gas stream for 5 hours. Then, 25 μl of tributyl phosphate and 36 mg of antimony trioxide were added and the same aluminum compound solution as used in Example 1 was added so that the level of addition of aluminum atom was 0.5 mole per 100 moles of the dicarboxylic acid component. The temperature was increased to 260° C. and, under gradual decompression, to 280° C. The pressure was finally reduced to about 0.1 mmHg, at which pressure the polymerization reaction was conducted for 1 hour. The resulting polymer was an orange-colored polyester resembling hard rubber. It was transparent in molten state. Its glass transition temperature was −5° C. but as it was amorphous, melting point was not determined. The intrinsic viscosity $[\eta]$ of this product was 0.59 dl/g. The FT-IR spectrum of this polyester is shown in FIG. 5.

EXAMPLE 9

Preparation of the aluminum compound

In a 1-liter flask, 30.6 g (0.15 mole) of aluminum isopropoxide was dissolved in 150 ml of n-hexane, and in a nitrogen gas stream at 20° C., a solution of 36.6 g (0.30 mole) of benzoic acid in 148 ml of isopropyl alcohol was added dropwise over a period of 20 minutes. The mixture was stirred at that temperature for 15 minutes and the precipitated aluminum compound was recovered by filtration. This white powder was dried in vacuo at 50° to 60° C. for 4 hours. Yield 45.6 g.

Polymerization

A reaction vessel similar to that used in Example 1 was charged with one or more of the dicarboxylic acid dimethyl esters (CH$_3$OOC—R$_1$—COOCH$_3$) and one or more of the diols (HO—D—OH), which are listed in Table 1, in a molar ratio of 0.5:1.1. The transesterification reaction was conducted and the excess diol was removed under the same conditions as Example 1. Then, a suspension of the above aluminum compound [0.6 weight % of the theoretical yield of polyester (0.4 to 0.7 mole % based on dicarboxylic acid component)] in a small amount of diol [ethylene glycol in Example 9 (a) to (e) and 1,4-butanediol in Example 9 (f) to (i)] was added, and in the presence of one or more of the polymerization catalysts mentioned in Table 1, the polymerization reaction was conducted in accordance with the procedure set forth in Example 1. In Example 9 (i), however, the polymerization was conducted at 260° C. for 120 minutes. The intrinsic viscosity [η] values of the polyesters thus produced are presented in Table 1. All the polyesters were transparent in molten state.

TABLE 1

| Example | —R$_1$— in dicarboxylic acid component[1] | —D— in diol component[1] | Polymerization catalyst | Intrinsic viscosity (dl/g) of product polyester |
|---|---|---|---|---|
| 9 (a) |  | —(CH$_2$)$_5$— | Potassium titanium oxalate, 200 ppm | 0.62 |
| 9 (b) |  | —(CH$_2$)$_6$— | Potassium titanium oxalate, 200 ppm | 0.68 |
| 9 (c) |  | —(CH$_2$)$_2$—CH(CH$_3$)—(CH$_2$)$_2$— | Potassium titanium oxalate, 200 ppm | 0.87 |
| 9 (d) |  | —(CH$_2$)$_8$— | Potassium titanium oxalate, 200 ppm | 0.60 |
| 9 (e) |  | —(CH$_2$)$_{10}$— | Potassium titanium oxalate, 200 ppm | 0.58 |
| 9 (f) | —(CH$_2$)$_4$— | —(CH$_2$)$_2$— | Zinc acetate, 300 ppm Sb$_2$O$_3$, 400 ppm | 0.52 |
| 9 (g) | —(CH$_2$)$_8$— | —(CH$_2$)$_2$— | Zinc acetate, 300 ppm Sb$_2$O$_3$, 400 ppm | 0.66 |
| 9 (h) | 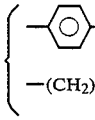 (60) / —(CH$_2$)$_8$— (40) | —(CH$_2$)$_2$— (70) / —CH$_2$—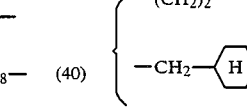—CH$_2$— (30) | Zinc acetate, 300 ppm Sb$_2$O$_3$, 400 ppm | 0.92 |
| 9 (i) | 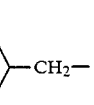 (60) / 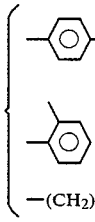 (5) / 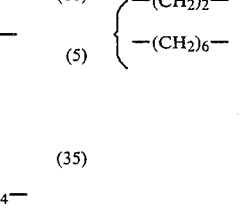 (35) / —(CH$_2$)$_4$— | —(CH$_2$)$_2$— (87) / —(CH$_2$)$_6$— (13) | Calcium acetate, 450 ppm Sb$_2$O$_3$, 230 ppm | 0.68 |

Note
[1]The figure in parentheses represents mole %.

EXAMPLE 10

A 300 ml three-necked flask fitted with nitrogen gas inlet tubing, stirrer and condenser was charged with 63.11 g of dimethyl terephthalate, 40.30 g of dimethyl sebacate, 60.29 g of ethylene glycol, 8.85 g of 1,6-hexanediol, 40 mg of zinc acetate, and a monocarboxylic acid selected from the group consisting of caproic acid, lauric acid, palmitic acid, melissic acid, linolenic acid, diphenylacetic acid, benzoic acid, p-ethylbenzoic acid, β-naphthoic acid, anthracene-2-carboxylic acid and 1-chloroanthraquinone-2-carboxylic acid (1.25 mole % based on the combined amount of dimethyl terephthalate and dimethyl sebacate), and the reaction was conducted in a nitrogen gas stream at 200° C. for 3 hours, with removal of methanol. Then, 25 μl of tributyl phosphate, 40 mg of antimony trioxide and 0.81 g of aluminum acetylacetonate were added and dissolved, and the temperature was increased to 260° C. and, under gradual decompression, to 280° C. At the reduced pressure of 0.1 mmHg, the polymerization reaction was conducted for 90 minutes. In this manner, the corresponding polyesters were produced. All of these polyesters were transparent in molten condition. Their intrinsic viscosity [$\eta$] values were 0.72 to 0.86 dl/g, and the glass transition temperature and melting point of the polyesters were invariably −4° C. and 78° C., respectively.

EXAMPLES 11 (a) THROUGH (i)

The transesterification and polymerization reactions were conducted in the same manner as Example 10 except that the aluminum compound prepared in Example 9 was used as dispersed in a small amount of 1,4-butanediol and that none of the monocarboxylic acids was employed. The levels of addition of the aluminum compound relative to the combined amount of dimethyl terephthalate and dimethyl sebacate were 0.1, 0.2, 0.3, 0.4, 0.6, 0.8, 1.0, 2.0 and 4.0 mole % [corresponding to Example 12 (a), (b), (c), (d), (e), (f), (g), (h), and (i)]. The corresponding polyesters thus obtained were invariably transparent in the molten condition. They had intrinsic viscosity [$\eta$] values in the range of 0.75 to 0.92 dl/g, a glass transition temperature of 31 4° C. and a melting point of 78° C.

COMPARATIVE EXAMPLE 1

Preparation of the aluminum compound

A 200 ml round-bottomed flask fitted with nitrogen gas inlet tubing, stirrer and condenser was charged with 50 ml of hexylene glycol, followed by addition of 10 g of powdery aluminum isopropoxide. The temperature was increased to 120° C. to thereby distill off isopropyl alcohol and dissolve the aluminum isopropoxide. The above procedure yielded an aluminum compound solution.

Polymerization

A polymerization vessel similar to that used in Example 1 was charged with 100 g of dimethyl terephthalate, 68 g of ethylene glycol and 40 mg of zinc acetate, and the transesterification reaction was conducted in a nitrogen gas stream at 200° C. for 3 hours. Then, 25 μl of tributyl phosphate and 40 mg of antimony trioxide were added, and the above aluminum compound solution was added so that 0.52 mole of aluminum was available for reaction per 100 moles of dimethyl terephthalate. The reaction system was increased to 260° C. and, under gradual decompression, to 280° C. Then, at a reduced pressure of about 0.1 mmHg, the polymerization reaction was carried out for 90 minutes. After 60 minutes of polymerization, the polymer began to stick to the stirring rod, so that stirring was difficult in the later stages of the polymerization reaction. The polyester thus obtained was light-yellow and included a large amount of granular insoluble gels.

COMPARATIVE EXAMPLE 2

Preparation of the aluminum compound

Using the same reaction vessel as that used for preparation of the aluminum compound in Comparative Example 1, 0.01 mole of p-hydroxybenzoic acid was dissolved in 50 ml of hexylene glycol followed by addition of 0.05 mole of aluminum isopropoxide. The mixture was reacted under heating at 100° C. to give a transparent aluminum compound solution.

Polymerization

The same polymerization procedure as that described in Comparative Example 1 was followed except that the above-prepared aluminum compound solution instead of the aluminum compound solution used in Comparative Example 1 was added in an amount giving 0.52 mole of aluminum per 100 moles of dimethyl terephthalate. After 60 minutes of polymerization, the polymer began to stick around the stirring rod as it occurred in Comparative Example 1, polyester was pale yellow and included a large number of large insoluble gel grains.

COMPARATIVE EXAMPLE 3

Preparation of the aluminum compound

The same reaction vessel as that used in Comparative Example 1 was charged with 50 ml of xylene and 0.05 mole of aluminum isopropoxide, and the mixture was heated at 100° C. to dissolve the latter. Then, 0.05 mole of acetylacetone was added and reacted for 15 minutes to give a light-brown transparent aluminum compound solution.

Polymerization

The same polymerization procedure as that described in Comparative Example 1 was followed except that the above aluminum compound solution instead of the aluminum compound solution of Comparative Example 1 was added in an amount giving 0.2 mole of aluminum per 100 moles of dimethyl terephthalate. The polymerization time was 90 minutes. The sticking of the polymer around the stirring rod was observed again in a later stage of polymerization. The resulting polyester was light-yellow and included insoluble gel-like particles.

COMPARATIVE EXAMPLE 4

Preparation of the aluminum compound

The same reaction vessel as that used in Comparative Example 1 was charged with 50 ml of xylene and 0.05 mole of aluminum isopropoxide and the latter was dissolved at room temperature. Then, 0.05 mole of acetylacetone was added and the mixture was stirred at a temperature of 50° C. for 30 minutes. Then, 0.10 mole of acetic acid was added and the reaction was further conducted at 50° C. for 30 minutes. The temperature was increased to 120° C. to distill off the isopropyl alcohol, giving an aluminum compound solution.

Polymerization

The same polymerization procedure as that described in Comparative Example 1 was followed except that the above aluminum compound solution instead of the one prepared in Comparative Example 1 was added in an amount giving 0.52 mole of aluminum per 100 moles of dimethyl terephthalate. At 60 minutes of polymerization, the polymer began to stick tenaciously to the stirring rod so that the polymerization reaction was terminated. The resulting polyester was light yellow and included insoluble gel particles.

COMPARATIVE EXAMPLE 5

The same transesterification and polymerization procedures as Example 11 were followed except that the aluminum compound was used in an amount of 6.0 mole % based on the combined amount of dicarboxylic acid diesters. The system ceased to flow and gelled in the course of polymerization.

COMPARATIVE EXAMPLE 6

The same transesterification procedure as Example 2 was followed except that methyl benzoate was used in an amount of 6.0 g, followed by polymerization at 280° C. and 0.1 mmHg for 120 minutes. The resulting polyester was brittle, having an intrinsic viscosity [η] of 0.42 dl/g.

EXAMPLE 12

The polyesters obtained in Examples 7 and 8 were each formed at 180° C. into an about 100 micron thick layer on a biaxially oriented polyethylene terephthalate film (100 microns thick). Further, a 100 micron thick ethylene-vinyl alcohol copolymer (ethylene content: 30 mole percent) film was placed on the polyester layer and the whole was heated at 180° C. under pressure (10 kg/cm²) for 2 minutes and then quenched to give a three-layered film. From this film, 15 mm wide specimens were cut off and subjected to a T peeling test at room temperature using a tensile tester (pulling velocity: 200 mm/minute). As a control for each polyester, a three-layered film was prepared using the corresponding polyester produced without the addition of the aluminum compound as the interposing layer and tested for T-peeling strength. The results thus obtained are summarized in Table 2.

TABLE 2

| Polyester | Amount of Al compound added (mole % on dicarboxylic acid component basis) | T-peeling strength (kg/cm) |
| --- | --- | --- |
| Example 7 | 0.5 | 1.97 |
| (Control therefor) | 0 | 0.03 |
| Example 8 | 0.5 | 2.50 |
| (Control therefor) | 0 | 0.30 |

EXAMPLE 13

The polyesters obtained in Examples 10 and 11(a)–(i) were each formed into a quenched film about 100 microns thick using a hot press and then interposed between an ethylene-vinyl alcohol copolymer (ethylene content: 45 mole %) film (100 microns thick) and a polyethylene terephthalate film (100 microns thick). The whole was pressed (10 kg/cm²) at 180° C. and then maintained at 280° C. in an almost load-free condition for 2 minutes so as to cause melt fusion, followed by quenching by lightly pressing by means of a cooling press. From the thus obtained three-layered film, 15 mm wide specimens were cut off and subjected to a T peel test at room temperature and a pulling velocity of 20 mm/minute. As a control for the case in which the polyester of Example 11 was used, a three-layered film prepared in the same manner except that a polyester produced by using the aluminum compound in an amount of 0.05 mole % on the dicarboxylic acid component basis was used in place of the polyester of the invention and was also tested for T-peeling strength. The results thus obtained are summarized in Table 3.

TABLE 3

| Polyester | Amount of Al compound added (mole % on dicarboxylic acid component basis) | T-peeling strength (kg/cm) |
| --- | --- | --- |
| Example 10 | 0.5 | >2.0 (for each) |
| Example 11 (a) | 0.1 | 0.8 |
| Example 11 (b) | 0.2 | 1.2 |
| Example 11 (c) | 0.3 | 1.6 |
| Example 11 (d) | 0.4 | 2.0 |
| Example 11 (e) | 0.6 | 2.2 |
| Example 11 (f) | 0.8 | 2.3 |
| Example 11 (g) | 1.0 | 2.2 |
| Example 11 (h) | 2.0 | 2.4 |
| Example 11 (i) | 4.0 | 2.1 |
| Control for Example 11 | 0.05 | 0.2 |

It is seen that those polyester species which were produced by reacting not less than 0.1 mole % of the aluminum compound with the dicarboxylic acid components were much higher in adhesivity as compared with the polyester produced by using less than 0.1 mole % of the aluminum compound.

COMPARATIVE EXAMPLE 7

Following the procedure of Example 13 except that various carboxylic acid-modified polyolefin adhesives specified in Table 4 were used in place of the polyester of the invention used in Example 13, there were prepared three-layered films having the construction "polyethylene terephthalate/carboxylic acid-modified polyolefin adhesive/ethylene-vinyl alcohol copolymer". These films were tested for peeling strength in the same manner as in Example 13. The results obtained are shown in Table 4. The Table 4 also includes the exothermic degradation initiation temperatures of the carboxylic acid-modified polyolefin adhesives as measured on a differential thermal analyzer (DTA) in air (rate of temperature rise: 10° C./minute).

TABLE 4

| Carboxylic acid-modified polyolefin adhesive | Exothermic degradation initiation temperature (°C.) | Peeling strength (kg/cm) |
| --- | --- | --- |
| Carboxylic acid-modified polyethylene (1) | 212 | 0.16 |
| Carboxylic acid-modified polyethylene (2) | 237 | 0.12 |
| Carboxylic acid-modified ethylene-propylene copolymer (3) | 224 | 0.01 |
| Carboxylic acid-modified ethylene-vinyl acetate copolymer (4) | 218 | 0.23 |
| Carboxylic acid-modified ethylene-vinyl acetate copolymer (5) | 220 | 0.71 |
| Carboxylic acid-modified ethylene-vinyl acetate copolymer (6) | 214 | 0.49 |
| Carboxylic acid-modified ethylene-vinyl acetate copolymer (7) | 206 | 0.01 |

Notes:
(1) Trademark ADMER LF500 (Mitsui Petrochemical Industries, Ltd.)
(2) Trademark ADMER NF500 (Mitsui Petrochemical Industries, Ltd.)
(3) Trademark ADMER QF500 (Mitsui Petrochemical Industries, Ltd.)
(4) Trademark MODIC E200H (Mitsubishi Petrochemical Company, Ltd.)
(5) Trademark MODIC E300K (Mitsubishi Petrochemical Company, Ltd.)
(6) Trademark CXA 1025 (E. I. du Pont de Nemours & Co.)
(7) Trademark CXA 3095 (E. I. du Pont de Nemours & Co.)

From the above results, it is understood that the conventional adhesives cannot laminate polyethylene terephthalate and ethylene-vinyl alcohol copolymer firmly. Since the conventional adhesives have a decomposition temperature lower than the molding temperature for polyethylene terephthalate (about 280° C.), it is also understandable that they can hardly be coextruded in a stable state with polyethylene terephthalate.

EXAMPLE 14

A 200-ml three-necked flask was charged with 100 g of dimethyl terephthalate, 67 g of ethylene glycol and 40 mg of zinc acetate and then was fitted with a stirrer, a nitrogen gas inlet tube and a condenser. The contents were heated at 200° C. for 180 minutes so as to effect the transesterification. Thereafter, 49 mg of tributyl phosphate and 40 mg of antimony trioxide were added, the temperature was raised to 240° C. and the excess ethylene glycol was distilled off by reducing the pressure gradually. The flask was again filled with nitrogen gas and then a dispersion of 0.6 g of the aluminum compound prepared in Example 9 in 5 ml of 1,4-butanediol was added portionwise. After completion of the addition, stirring was continued at 240° C. for 10 minutes, then the temperature was raised to 280° C. and thereafter the pressure was reduced gradually and the polycondensation was allowed to advance for 120 minutes under reduced pressure (0.2 mmHg). The thus-obtained polyester was transparent and almost colorless in the molten state. It had an $[\eta]$ value of 0.72 dl/g, a glass transition temperature of 74° C. and a melting point of 252° C.

EXAMPLE 15

Following the procedure of Example 14 but using, as the dicarboxylic acid components, 38.8 g of dimethyl terephthalate and 69 g of dimethyl sebacate and, as the diol components, 55 g of ethylene glycol and 18 g of 1,4-butanediol, together with a suspension of the aluminum compound prepared in Example 9 in 10 ml of 1,4-butanediol, the transesterification reaction and polymerization were carried out (the polymerization temperature being 270° C.). The thus-obtained polyester was at first slightly yellow and transparent. Upon standing at room temperature, it began to become cloudy. This indicated partial crystallization. It had an $[\eta]$ value of 0.82 dl/g, a glass transition temperature of −1° C. and a melting point of 104° C.

EXAMPLE 16

Using 56.3 g of dimethyl terephthalate, 7.8 g of dimethyl isophthalate and 39.1 g of dimethyl sebacate as the dicarboxylic acid components, and 59.3 g of ethylene glycol and 12.9 g of 1,4-butanediol as the diol components, the transesterification and polymerization were carried out in the same manner as in Example 15. The polyester obtained was slightly yellow and transparent but, upon standing at room temperature, became cloudy, which was indicative of partial crystallization. It had an $[\eta]$ value of 0.77 dl/g, a glass transition temperature of 2° C. and a melting point of 86° C.

EXAMPLE 17

Using the polyesters obtained in Examples 14, 15 and 16 following the procedure of Example 13, three-layered films having the construction "polyethylene terephthalate/polyester obtained in Examples 14, 15 or 16, respectively/ethylene-vinyl alcohol copolymer (ethylene content: 30 mole %) were produced and subjected to a T peel test.

Furthermore, rectangular specimens, 15 mm wide and 80 mm long, were cut off from the above three-layered films and uniaxially stretched about 3.3 times at a stretching temperature of 90° C. and a stretching speed of 300%/minute. The thus-oriented films were also subjected to T peel testing in the same manner. The evaluation results with respect to adhesivity and stretchability are shown in Table 5.

TABLE 5

| Polyester | Glass transition temperature (°C.) | Melting point (°C.) | T peeling strength (before stretching) (kg/cm) | Stretchability (at 90° C.) | T peeling strength (after stretching) (kg/cm) |
|---|---|---|---|---|---|
| Example 14 | 74 | 252 | 0.4 | Good | 0.1 |
| Example 15 | −1 | 104 | 1.2 | Costretching impossible (interlayer separation) | |
| Example 16 | 2 | 86 | 2.0 | Good | 1.2 |

Note:
when the laminated sheet comprising the polyester of Example 15 was costretched at 110° C., its stretchability was good and the T peeling strength remained at a high level.

The results shown in Table 5 indicate that when the polyester of the invention is to be used as an adhesive, it is desirable that the glass transition temperature is not higher than 30° C. and that when the laminates obtained by using such adhesive are to be costretched, the melting point of the polyester of the invention should desirably be lower than the stretching temperature. If these requirements are met, the stretchability will be good and the peeling strength after stretching will retain a high value.

EXAMPLE 18

The transesterification vessel of a polyester polymerization apparatus was charged with 23.2 kg of dimethyl terephthalate, 3.2 kg of dimethyl isophthalate, 16.2 kg of dimethyl sebacate, 5.5 kg of 1,4-butanediol, 25.6 kg of ethylene glycol, 49.7 g of trimethylolpropane and 12 g of zinc acetate. The contents were heated at 200°–235° C. for 210 minutes so as to drive the transesterification reaction to completion. The reaction mixture was fed to a polymerization vessel preheated to 240° C. Thereto were added 18.8 g of triphenyl phosphate and 28 g of antimony trioxide, and the pressure within the polymerization vessel was gradually reduced to 20 mmHg so as to distill off the excess glycols. Then, the vessel was filled with nitrogen gas, a dispersion of 240 g of the same aluminum compound as prepared in Example 9 in 4 liters of 1,4-butanediol was added. The whole mixture was stirred for 10 minutes as the temperature was raised to 260° C. and the pressure was gradually reduced to below 0.1 mmHg so as to advance the polycondensation. By adjusting the polymerization period within the range of up to 150 minutes, four polymeric species shown in Table 6 were obtained. Each polymeric species was extended to a strand-like form and pelletized using a pelletizer, followed by drying at 80° C. for 24 hours. The pellets thus obtained weighed about 30 kg. The [η] values of such four polyesters are shown in Table 6.

Figure 6:
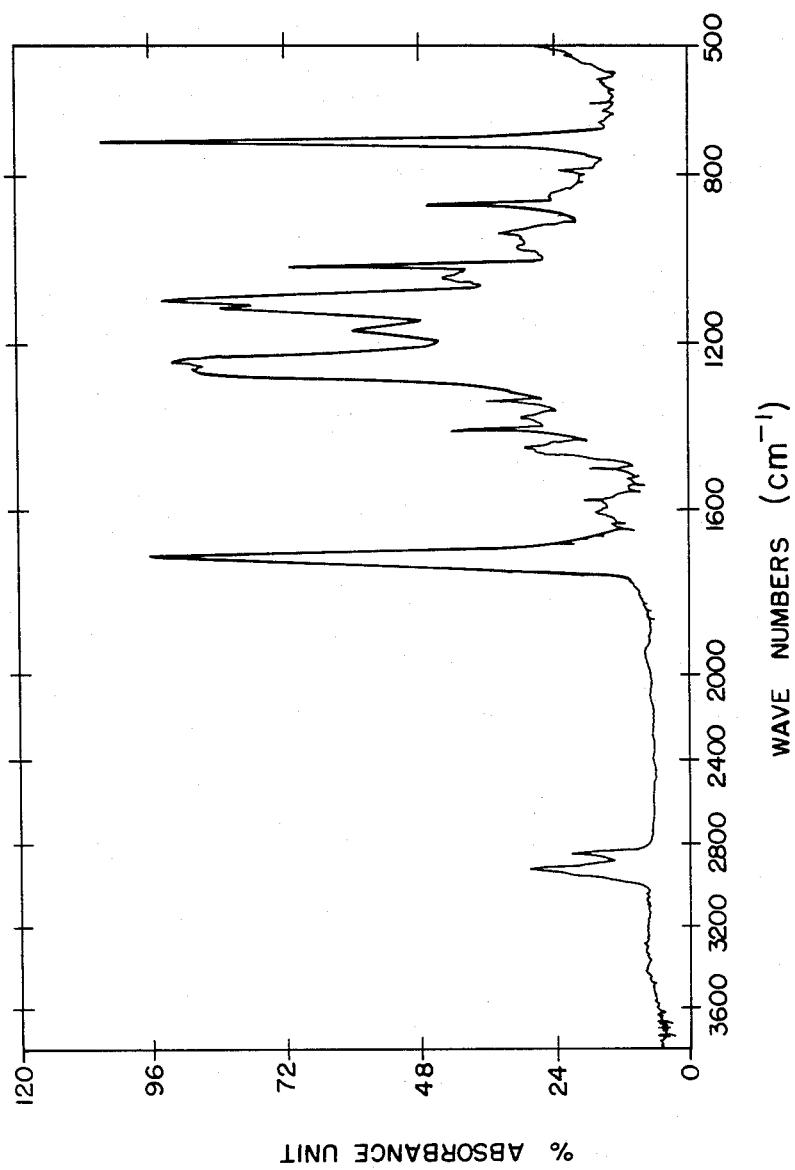

Among the polyesters shown in Table 6, that one having the [η] value of 1.10 dl/g (polymerization period: 150 minutes) had an apparent melt viscosity of 3,500 poises as determined on a Koka flow tester (Shimadzu Corporation) at a temperature of 260° C. and a shear rate of $10^2$ sec$^{-1}$, a glass transition temperature of 1° C. and a melting point of 86° C. In the molten state, it was transparent. The FT-IR spectrum of such polyester is shown in FIG. 6.

Using the four polyesters, each as an interposing layer, three-layered laminate sheets were produced. Thus, each of said polyesters, a copolymerized polyethylene terephthalate (Eastman Chemical Products Inc.; KODAPAK 9921) and an ethylene-vinyl alcohol copolymer (ethylene content: 45 mole %) were fed to the same die (die temperature: 250° C.) through three extruders at resin temperatures of 180° C. (polyester produced above), 260° C. (copolymerized polyethylene terephthalate) and 230° C. (ethylene-vinyl alcohol copolymer) and coextruded to an about 500-micron-thick three-layered laminate sheet in the manner of multi-manifold coextrusion molding. Such laminate sheet was further stretched 2.5 times uniaxially at 90° C. For each polyester, the state of coextrusion and the T peeling strength of the sheet before stretching and that after stretching (determined by the method described in Example 13) are summarized in Table 6.

TABLE 6

| [η] (dl/g) of the polyester | State of coextrusion | T peeling strength of sheet (kg/cm) | |
|---|---|---|---|
| | | Before stretching | After stretching |
| 0.60 | Uneven distribution of the polyester at the sheet edge | — | — |
| 0.75 | Almost uniform sheet | 1.8 | 1.0 |
| 0.93 | Uniform sheet | 2.3 | 1.2 |
| 1.10 | " | 2.4 | 1.2 |

From the above results, it may be concluded that for use in lamination by coextrusion, the polyester of the invention should preferably have an intrinsic viscosity of not less than 0.7 dl/g, more preferably not less than 0.8 dl/g. It is also seen that the state of coextrusion and the peeling strength of the laminate sheet differ little within the intrinsic viscosity range exceeding 0.8 dl/g.

Using the polyester (A) having the [η] value of 1.10 dl/g as an adhesive for a copolymerized polyethylene terephthalate (Eastman Chemical Products Inc.; KODAPAK 9921) (B) and an ethylene-vinyl alcohol copolymer (ethylene content: 30 mole %) (C), a five-layered sheet (total thickness: 1,360 microns) having the construction (B)/(A)/(C)/(A)/(B) was formed by the multi-manifold coextrusion molding method. The sheet obtained was found to be a coextruded sheet having a good appearance with the layers laminated each in an almost uniform thickness throughout the whole width (500 mm). The T peeling strength of this sheet was 1.5 kg/cm, and the peeling face was the interface between the polyester of the invention (A) and the ethylene-vinyl alcohol copolymer (C). Other adhesion interfaces remained firmly adhered together.

In addition, using the polyester having the intrinsic viscosity [η] of 0.93 dl/g as shown in Table 6, a five-layered sheet having the construction "polyethylene terephthalate/polyester of the invention/ethylene-vinyl alcohol copolymer (ethylene content: 45 mole %)/polyester of the invention/polyethylene terephthalate" was produced in the same manner as in Example 13. The T peeling strength of this sheet, when measured in the same manner as in Example 13, was 2.8 kg/cm. This sheet was allowed to stand under conditions of 25° C. and 70% RH for 2 months and then the T peeling strength was measured and found to be 2.6 kg/cm. The peeling strength thus decreased little with time.

EXAMPLE 19

The transesterification vessel of a polyester polymerization apparatus was charged with a dispersion of 1.24 liters of colloidal silica (Nissan Chemical Industries, Ltd.; SNOWTEX-20L) in 23.09 kg of ethylene glycol, 23.92 kg of dimethyl terephthalate, 2.06 kg of dimethyl isophthalate, 12.58 kg of dimethyl adipate, 10.93 kg of diethylene glycol, 33.1 g of trimethylolpropane and 40 g of calcium acetate. The contents were heated at 200°–235° C. for 210 minutes so as to drive the transesterification reaction to completion. The reaction mixture was fed to a polymerization vessel preheated to 240° C. Thereto were added 18.8 g of triphenyl phosphate and 28 g of antimony trioxide, and the pressure within the polymerization vessel was gradually reduced to 20 mmHg so as to distill off the excess glycols. Then, the vessel was filled with nitrogen gas, a dispersion of 240 g of the same aluminum compound as prepared in Example 9 in 2 liters of 1,4-butanediol and 2 liters of diethylene glycol was added, the whole mixture was stirred for 10 minutes, the temperature was raised to 260° C. and the pressure was gradually reduced to below 0.1 mmHg, at which pressure the polymerization reaction was conducted for 150 minutes. The resulting polymer was extruded to a strand-like form and pelletized using a pelletizer, followed by drying at 80° C. for 24 hours. The pellets thus obtained weighed about 30 kg. The [η] value of this polyester was 1.10 dl/g. In the molten state, this polymer was slightly cloudy, owing to the colloidal silica. It had a glass transition temperature of 3° C. and a melting point of 103° C.

Using this polyester (A) as an adhesive for a copolymerized polyethylene terephthalate (Eastman Chemical Products Inc.; KODAPAK 9921) (B) and an ethylene-vinyl alcohol copolymer (ethylene content: 30 mole %) (C), a five-layered tube having the construction (B)/(A)/(C)/(A)/(B) was coextrusion molded. One end of this tube was closed by fusion to give a closed-end parison, which was heated at 105° C. and stretch blow molded. The thus-obtained five-layered hollow vessel had good mechanical strength, shock resistance, water resistance and gas barrier function as well as good transparency without interlayer separation, and was very suitable for use as a container for drinks, etc.

EXAMPLE 20

The transesterification vessel of a polyester polymerization apparatus was charged with 24.8 kg of dimethyl terephthalate, 1.2 kg of dimethyl isophthalate, 12.6 kg of dimethyl adipate, 25.5 kg of ethylene glycol, 4.9 kg of 1,6-hexanediol, 0.050 kg of pentaerythritol and 33 g of calcium acetate and the transesterification reaction was driven to completion by heating the contents at 200°–235° C. for 210 minutes. Then, 0.090 kg of benzoic acid was added and the whole mixture was fed to a polymerization vessel preheated at 240° C., a solution of 16.4 g of phosphoric acid (85% pure) was added and further 16.5 g of antimony trioxide was added. The pressure within the polymerization vessel was gradually reduced to 20 mmHg so as to distill off the excess glycols. Thereafter, 240 g of the same aluminum compound as prepared in Example 9 was added and the polycondensation was allowed to proceed for 150 minutes. The polyester produced was collected in the form of pellets. Such polyester had an $[\eta]$ value of 1.25 dl/g was transparent in the molten state.

EXAMPLE 21

A 200-ml three-necked flask provided with nitrogen gas inlet tube, stirrer, condenser and heating device was charged with 63.11 g of dimethyl terephthalate, 40.30 g of dimethyl sebacate, 55.40 g of ethylene glycol, 8.85 g of 1,6-hexanediol and 0.04 g of zinc acetate. The contents were heated in a nitrogen gas atmosphere at 200° C. for 3 hours, while the by-product methanol was distilled off. Then, 0.17 g of trimellitic anhydride was added, the mixture was stirred for 20 minutes, then 25 mg of tributyl phosphate, 40 mg of antimony trioxide and a dispersion of 0.60 g of the aluminum compound synthesized in Example 9 in a small amount of 1,4-butanediol were added gradually so as to allow dissolution, the temperature was then raised to 260° C. and the pressure was reduced gradually while gradually raising the temperature. In this manner, the polymerization was effected under reduced pressure (0.1 mmHg) at 280° C. for 90 minutes. The polyester thus obtained was transparent in the molten state and had an $[\eta]$ value of 1.05 dl/g.

EXAMPLE 22

The polyesters obtained in Examples 1-5 and an ordinary, aluminum compound-free polyethylene terephthalate species ($[\eta]=0.70$ dl/g) (for comparison) were each formed to an about 200 micron thick quenched film using a hot press. Separately, a carboxylic acid-modified polyethylene and a carboxylic acid-modified ethylene-vinyl acetate copolymer each in a chip form were sufficiently dried and were each molded to an about 200 micron thick quenched film. The polyester film and the carboxylic acid-modified polyethylene film or carboxylic acid-modified ethylene-vinyl acetate copolymer film were placed one over another, pressed together at 180° C. under pressure (10 kg/cm$^2$), then maintained in an almost load-free condition at 280° C. for 2 minutes so as to cause melt fusion and finally quenched by lightly pressing by a cooling press. From the laminated sheet thus obtained, rectangular test specimens, 15 mm wide, were cut off, allowed to stand at room temperature overnight and then subjected to a T peeling test at a pulling speed of 20 mm/minute. The results obtained are shown in Table 7.

TABLE 7

| Polyester | T peeling strength (g/cm) | |
|---|---|---|
| | Carboxylic acid-modified ethylene-vinyl acetate copolymer[1] | Carboxylic acid-modified polyethylene[2] |
| Example 1 | >2170[3] | >2130[3] |
| Example 2 | >2000[3] | >2000[3] |
| Example 3 | >2170[3] | >2130[3] |
| Example 4 | >2230[3] | >2030[3] |
| Example 5 | >2050[3] | >2150[3] |
| Polyethylene | 220 | 480 |

TABLE 7-continued

| Polyester | T peeling strength (g/cm) | |
|---|---|---|
| | Carboxylic acid-modified ethylene-vinyl acetate copolymer[1] | Carboxylic acid-modified polyethylene[2] |
| terephthalate (Comparative) Example) | | |

Notes:
[1]Trademark CXA 1025 (E. I. du Pont de Nemours & Co.)
[2]Trademark ADMER NF500 (Mitsui Petrochemical Indurstries, Ltd.)
[3]The carboxylic acid-modified polymer layer was fractured, so that such value was calculated on the basis of the load at breakage.

EXAMPLE 23

Using several 100 micron thick quenched films made of different carboxylic acid-modified polyolefins (G) and a 100 micron thick quenched film of an ethylene-vinyl alcohol copolymer (ethylene content: 45 mole %) (H), three-layered quenched films having the construction (G)/(H)/(G) were produced in the same manner as in Example 22. Furthermore, by repeating the procedure of Example 22, a 300 micron thick sheet (F) made of the polyester obtained in Example 14 or of polyethylene terephthalate (control) was laminated to both sides of such three-layered films. There were thus produced three-component five-layered sheets having the construction (F)/(G)/(H)/(G)/(F). They were subjected to a T peeling test in the same manner as in Example 22. The results obtained are shown in Table 8.

TABLE 8

| Polyester (F) | Carboxylic acid-modified polyolefin (G) | Interface where peeling occurred | T peeling strength (kg/cm) |
|---|---|---|---|
| Example 14 | Carboxylic acid-modified polyethylene (1) | (F)/(G) | 0.82 |
| Example 14 | Carboxylic acid-modified ethylene-vinyl acetate copolymer (2) | (H)/(G) | 0.89 |
| Example 14 | Carboxylic acid-modified ethylene-vinyl acetate copolymer (3) | (F)/(G) | 0.80 |
| Polyethylene terephthalate (Control Example) | Carboxylic acid-modified polyethylene (1) | (F)/(G) | 0.12 |

Notes:
(1) Trademark ADMER NF500 (Mitsui Petrochemical Industries, Ltd.)
(2) Trademark CXA 1025 (E. I. du Pont de Nemours & Co.)
(3) Trademark MODIC E300K (Mitsubishi Petrochemical Company, Ltd.)

What is claimed is:

1. A thermoplastic polyester comprising the constituent units represented by the following formulas (I), (II), (III) and (IV):

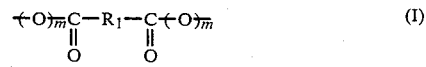

(I)

(II)

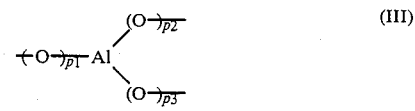

(III)

-continued

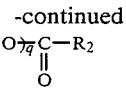  (IV)

wherein $R_1$, in its repeated occurrence in said polyester, represents one or more divalent groups each derived from a dicarboxylic acid selected from the group consisting of terephthalic acid, isophthalic acid, orthophthalic acid and a straight-chained aliphatic dicarboxylic acid containing 4 to 10 carbon atoms by removal of both carboxyl groups therefrom, $R_2$, in its repeated occurrence in said polyester, represents one or more monovalent groups each selected from the group consisting of an aliphatic or alicyclic monocarboxylic acid containing 6 to 30 carbon atoms and an aromatic monocarboxylic acid containing 7-20 carbon atoms by removal of the carboxyl group therefrom, D, in its repeated occurrence in said polyester, represents one or more divalent groups each derived from a diol selected from the group consisting of an aliphatic diol containing 2 to 10 carbon atoms and an alicyclic diol containing 6 to 8 carbon atoms by removal of both hydroxyl groups therefrom, and m, n, $p_1$, $p_2$, $p_3$ and q are each an integer of 0 or 1, said constituent units being bonded together in the combinations of (I)-(II), (I)-(III), (II)-(III), (II)-(IV), (III)-(III) and (III)-(IV) and via only one oxygen atom in each combination, the molar ratio (I):(II) being substantially 1:1, the molar ratio (I):(III) being in the range of 1,000:1 to 100:5 and the molar ratio (III):(IV) being in the range of 4:1 to 1:10, said polyester having an intrinsic viscosity of not less than 0.5 dl/g.

2. The thermoplastic polyester of claim 1 which, in addition to the constituent units (I), (II), (III) and (IV), further comprises at least one member of the group consisting of polyvalent residues represented by the following formulas (V), (VI), (VII) and (VIII):

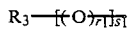  (V)

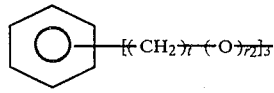  (VI)

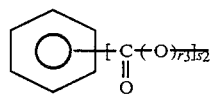  (VII)

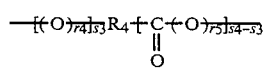  (VIII)

wherein $s_1$, $s_2$ and $s_4$ are each an integer of 3 or 4, $s_3$ is an integer of from 1 to $s_4-1$, $R_3$ is an aliphatic organic residue containing 3 to 9 carbon atoms and having a valence of $s_1$, $R_4$ is an aliphatic organic residue containing 2 to 4 carbon atoms and having a valence of $s_4$, the valence of the benzene nucleus in (VI) is 3, the valence of the benzene nucleus in (VII) is $s_2$, t is an integer of 1 to 4, $r_1$, $r_2$, $r_3$, $r_4$ and $r_5$ are each an integer of 0 or 1, each free bond of the constituent units (V) and (VI) being bonded to a unit selected from the group consisting of (I), (III), (IV), (VII) and (VIII), each free bond of the constituent unit (VII) being bonded to a unit selected from the group consisting of (II), (III), (V), (VI) and (VIII) and each free bond of the constituent unit (VIII) being bonded to a unit selected from the group consisting of (I)-(VIII), each bonding between two constituent units being made via only one oxygen atom, the molar ratio (I):(V)+(VI)+(VII)+(VIII) being in the range of 100:0 to 100:1 and the content of (IV) being the sum of a content corresponding to the molar ratio of (III):(IV) which is 4:1 to 1:10 and a content corresponding to the molar ratio of (IV):(V)+(VI)+(VII)+(VIII) which is in the range of 0:1 to 15:1, said polyester having an intrinsic viscosity of not less than 0.7 dl/g.

3. A method of producing a thermoplastic polyester comprising the constituent units represented by the following formulas (I), (II), (III) and (IV):

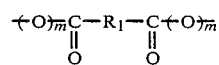  (I)

  (II)

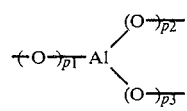  (III)

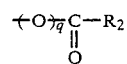  (IV)

wherein $R_1$, in its repeated occurrence in said polyester, represents one or more divalent groups each derived from a dicarboxylic acid selected from the group consisting of terephthalic acid, isophthalic acid, orthophthalic acid and a straight-chained aliphatic dicarboxylic acid containing 4 to 10 carbon atoms by removal of both carboxyl groups therefrom, $R_2$, in its repeated occurrence in said polyester, represents one or more monovalent groups each selected from the group consisting of an aliphatic or alicyclic monocarboxylic acid containing 6 to 30 carbon atoms and an aromatic monocarboxylic acid containing 7-20 carbon atoms by removal of the carboxyl group therefrom, D, in its repeated occurrence in said polyester, represents one or more divalent groups each derived from a diol selected from the group consisting of an aliphatic diol containing 2 to 10 carbon atoms and an alicyclic diol containing 6 to 8 carbon atoms by removal of both hydroxyl groups therefrom, and m, n, $p_1$, $p_2$, $p_3$ and q are each an integer of 0 or 1, said constituent units being bonded together in the combinations of (I)-(II), (I)-(III), (II)-(III), (II)-(IV), (III)-(III) and (III)-(IV) and via only one oxygen atom in each combination, the molar ratio (I):(II) being substantially 1:1, the molar ratio (I):(III) being in the range of 1,000:1 to 100:5 and the molar ratio (III):(IV) being in the range of 4:1 to 1:10, said polyester having an intrinsic viscosity of not less than 0.5 dl/g, which method comprises polycondensing at least one dicarboxylic acid selected from the group consisting of terephthalic acid, isophthalic acid, orthophthalic acid and a straight-chained aliphatic dicarboxylic acid containing 4 to 10 carbon atoms or an ester-forming derivative thereof with at least one diol selected from the group consisting of an aliphatic diol containing 2 to 10 carbon atoms and an alicyclic diol containing 6 to 8 carbon atoms in the presence of an aluminum compound of the formula

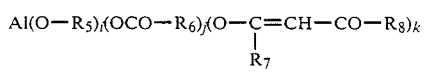

wherein $R_5$ is a monovalent group derived from an aliphatic, alicyclic or monocyclic aromatic alcohol by removal of the hydroxyl group therefrom, $R_6$ is a monovalent group derived from an aliphatic monocarboxylic acid containing 1 to 30 carbon atoms, an alicyclic monocarboxylic acid containing 6 to 30 carbon atoms, an aromatic monocarboxylic acid containing 7 to 20 carbon atoms, a monoester of a dicarboxylic acid corresponding to any of such monocarboxylic acids or a mono alkali metal salt of a dicarboxylic acid corresponding to any of such monocarboxylic acids by removal of the free carboxyl group, $R_7$ is a methyl or phenyl group, $R_8$ is a methyl or phenyl group or a monovalent group derived from an aliphatic alcohol by removal of the hydroxyl proton therefrom, i, j and k each represents the average number of respective groups bonded to the aluminum atom, $i+j+k=3$ and $0 \leq i \leq 2$, $0 \leq j \leq 3$ and $0 \leq k \leq 3$.

4. The method of claim 3, wherein the dicarboxylic acids or acids each in the ester form and the diol or diols are subjected to transesterification and, thereafter, said aluminum compound is added and the polycondensation is carried out.

5. The method of claim 3, wherein, in said aluminum compound, $j \neq 0$ and $R_6$ is a monovalent group derived from an aliphatic or alicyclic monocarboxylic acid containing 6 to 30 carbon atoms or an aromatic monocarboxylic acid containing 7 to 20 carbon atoms by removal of the carboxyl group therefrom and wherein the $-OR_5$ and $-O-C(R_7)=CH-O-R_8$ groups in said aluminum compound are substantially completely eliminated from the reaction system during the polycondensation reaction, whereby the $-OCOR_6$ group alone is allowed to be inserted into the polyester as the constituent unit (IV).

6. The method of claim 5, wherein, in said aluminum compound, $j \neq 0$ and $R_6$ is a phenyl group.

7. The method of claim 5, wherein, in said aluminum compound, $j \neq 0$ and $R_6$, in its repeated or single occurrence, represents a straight-chained alkyl group containing 5 to 17 carbon atoms and/or a p-hydroxyphenyl group.

8. The method of claim 3, wherein, in said aluminum compound, $j \neq 0$ and $R_6$ is a monovalent group derived from an aliphatic monocarboxylic acid containing 1 to 5 carbon atoms by removal of the carboxyl group therefrom or, in said aluminum compound, $j = 0$, and wherein one or more monocarboxylic acids each selected from the group consisting of an aliphatic or alicyclic monocarboxylic acid containing 6 to 30 carbon atoms and an aromatic monocarboxylic acid containing 7 to 20 carbon atoms either in the free or esterified form are added to the reaction system, whereby the $-OR_5$, $-OCOR_6$ and $-O-C(R_7)=CH-CO-R_8$ groups in said aluminum compound are substantially completely eliminated from the reaction system during the polycondensation reaction.

9. An adhesive consisting essentially of a thermoplastic polyester comprising the constituent units represented by the following formulas (I), (II), (III) and (IV):

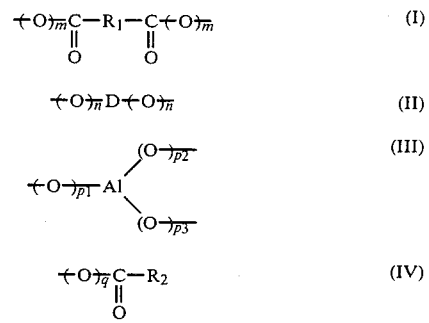

wherein $R_1$, in its repeated occurrence in said polyester, represents one or more divalent groups each derived from a dicarboxylic acid selected from the group consisting of terephthalic acid, isophthalic acid, orthophthalic acid and a straight-chained aliphatic dicarboxylic acid containing 4 to 10 carbon atoms by removal of both carboxyl groups therefrom, $R_2$, in its repeated occurrence in said polyester, represents one or more monovalent groups each selected from the group consisting of an aliphatic or alicyclic monocarboxylic acid containing 6 to 30 carbon atoms and an aromatic monocarboxylic acid containing 7-20 carbon atoms by removal of the carboxyl group therefrom, D, in its repeated occurrence in said polyester, represents one or more divalent groups each derived from a diol selected from the group consisting of an aliphatic diol containing 2 to 10 carbon atoms and an alicyclic diol containing 6 to 8 carbon atoms by removal of both hydroxyl groups therefrom, and m, n, $p_1$, $p_2$, $p_3$ and q are each an integer of 0 or 1, said constituent units being bonded together in the combinations of (I)-(II), (I)-(III), (II)-(III), (II)-(IV), (III)-(III) and (III)-(IV) and via only one oxygen atom in each combination, the molar ratio (I):(II) being substantially 1:1, the molar ratio (I):(III) being in the range of 1,000:1 to 100:5 and the molar ratio (III):(IV) being in the range of 4:1 to 1:10, said polyester having an intrinsic viscosity of not less than 0.5 dl/g and a glass transition temperature of not higher than 30° C.

* * * * *